United States Patent
Johnston et al.

(10) Patent No.: US 9,178,713 B1
(45) Date of Patent: Nov. 3, 2015

(54) OPTICAL LINE TERMINATION IN A PASSIVE OPTICAL NETWORK

(75) Inventors: Cesar A. Johnston, Sunnyvale, CA (US); John M. Chiang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 951 days.

(21) Appl. No.: 11/937,396

(22) Filed: Nov. 8, 2007

Related U.S. Application Data

(60) Provisional application No. 60/867,504, filed on Nov. 28, 2006.

(51) Int. Cl.
 *H04L 12/28* (2006.01)
 *H04L 7/00* (2006.01)
 *H04J 3/16* (2006.01)
 *H04J 14/00* (2006.01)

(52) U.S. Cl.
 CPC .......... *H04L 12/2861* (2013.01); *H04L 7/0075* (2013.01); *H04J 3/1652* (2013.01); *H04J 14/00* (2013.01)

(58) Field of Classification Search
 None
 See application file for complete search history.

(56) References Cited

U.S. PATENT DOCUMENTS

| | | | |
|---|---|---|---|
| 4,078,228 A | 3/1978 | Miyazaki | |
| 4,208,650 A | 6/1980 | Horn | |
| 4,539,676 A | 9/1985 | Lucas | |
| 4,731,782 A | 3/1988 | Shimizu et al. | |
| 5,422,880 A | 6/1995 | Heitkamp et al. | |
| 6,243,369 B1 | 6/2001 | Grimwood et al. | |
| 6,370,300 B1* | 4/2002 | Eggleton et al. | 385/37 |
| 6,498,667 B1* | 12/2002 | Masucci et al. | 398/98 |
| 6,526,462 B1* | 2/2003 | Elabd | 710/242 |
| 6,597,699 B1 | 7/2003 | Ayres | |
| 6,665,495 B1 | 12/2003 | Miles et al. | |
| 6,735,210 B1 | 5/2004 | Lindeborg et al. | |
| 6,738,364 B1 | 5/2004 | Saunders | |
| 6,757,251 B1 | 6/2004 | Nakaishi | |
| 6,941,391 B2 | 9/2005 | Kasper | |

(Continued)

FOREIGN PATENT DOCUMENTS

WO  WO 2005011158 A1 *  2/2005

OTHER PUBLICATIONS

ITU-T G.984.4 "Gigabit-capable Passive Optical Networks (G-PON): ONT management and control interface specification" International Telecommunication Union. Jun. 2004.*

(Continued)

*Primary Examiner* — Faruk Hamza
*Assistant Examiner* — Cassandra Decker

(57) ABSTRACT

In a line termination unit integrated circuit in a point-to-multipoint network, a receiver receives an upstream transmission from a network termination unit within the point-to-multipoint network, a transmitter transmits a downstream transmission to a network termination unit within the point-to-multipoint network, and an internal processor operatively coupled to the receiver processes sub-fields within the overhead field of the upstream transmission. The internal processor is also operatively coupled to the transmitter to assemble the overhead field of the downstream transmission. The upstream transmission is an upstream transmission convergence frame format having an overhead field and a payload field, and the downstream transmission is a downstream transmission convergence frame format having an overhead field and a payload field.

24 Claims, 11 Drawing Sheets

(56) References Cited

U.S. PATENT DOCUMENTS

| | | | |
|---|---|---|---|
| 6,999,543 | B1 | 2/2006 | Trinh et al. |
| 7,002,918 | B1 | 2/2006 | Prieto, Jr. et al. |
| 7,369,768 | B2 * | 5/2008 | Sakamoto et al. ............. 398/58 |
| 7,545,899 | B2 | 6/2009 | Amirichimeh et al. |
| 7,558,357 | B1 | 7/2009 | Greshishchev et al. |
| 7,571,216 | B1 | 8/2009 | McRae et al. |
| 7,643,753 | B2 | 1/2010 | Weitz et al. |
| 7,853,801 | B2 * | 12/2010 | Kim et al. ..................... 713/189 |
| 7,983,308 | B1 | 7/2011 | Johnston et al. |
| 7,991,296 | B1 | 8/2011 | Johnston et al. |
| 8,014,481 | B1 | 9/2011 | Chiang et al. |
| 8,208,815 | B1 | 6/2012 | Chiang et al. |
| 8,406,633 | B1 | 3/2013 | Johnston et al. |
| 8,634,431 | B1 | 1/2014 | Chiang et al. |
| 8,718,087 | B1 | 5/2014 | Johnston et al. |
| 8,913,895 | B1 | 12/2014 | Chiang et al. |
| 2001/0008550 | A1 | 7/2001 | Takahashi |
| 2002/0136232 | A1 | 9/2002 | Dudziak et al. |
| 2003/0048803 | A1 | 3/2003 | Tsai et al. |
| 2003/0137975 | A1 | 7/2003 | Song et al. |
| 2004/0017819 | A1 | 1/2004 | Kagan et al. |
| 2004/0071251 | A1 | 4/2004 | Sutioso et al. |
| 2004/0101068 | A1 * | 5/2004 | Wang et al. .................... 375/324 |
| 2004/0141759 | A1 | 7/2004 | Stiscia et al. |
| 2004/0208631 | A1 * | 10/2004 | Song et al. .................... 398/168 |
| 2004/0264974 | A1 | 12/2004 | Sorenson |
| 2005/0041727 | A1 | 2/2005 | Agazi |
| 2005/0125572 | A1 * | 6/2005 | Ganapathy et al. ............. 710/22 |
| 2005/0138212 | A1 * | 6/2005 | Yang ............................. 709/250 |
| 2005/0157641 | A1 | 7/2005 | Roy |
| 2005/0286544 | A1 | 12/2005 | Kitchin et al. |
| 2006/0002686 | A1 | 1/2006 | Arima |
| 2006/0104637 | A1 | 5/2006 | Huffman et al. |
| 2007/0003282 | A1 | 1/2007 | Boyd et al. |
| 2007/0025734 | A1 | 2/2007 | Oogushi et al. |
| 2007/0030936 | A1 | 2/2007 | Johnson et al. |
| 2007/0064604 | A1 | 3/2007 | Chen et al. |
| 2007/0065078 | A1 * | 3/2007 | Jiang ............................... 385/76 |
| 2007/0070997 | A1 | 3/2007 | Weitz et al. |
| 2007/0076648 | A1 * | 4/2007 | Yong ............................. 370/328 |
| 2007/0110441 | A1 | 5/2007 | Saito et al. |
| 2007/0133989 | A1 | 6/2007 | Kim et al. |
| 2007/0154215 | A1 | 7/2007 | Zuhdi |
| 2007/0264026 | A1 | 11/2007 | Miguel |
| 2007/0297390 | A1 | 12/2007 | Skog et al. |
| 2008/0002977 | A1 | 1/2008 | Mori |
| 2008/0019693 | A1 | 1/2008 | Sorin |
| 2008/0019706 | A1 | 1/2008 | Levinson et al. |
| 2008/0212472 | A1 | 9/2008 | Musacchio et al. |
| 2009/0016714 | A1 | 1/2009 | Soto et al. |
| 2009/0220232 | A1 | 9/2009 | Sarashina |
| 2009/0245784 | A1 * | 10/2009 | Wang ............................... 398/25 |

OTHER PUBLICATIONS

ITU-T G.984.3 "Gigabit-capable Passive Optical Networks (G-PON): Transmission convergence layer specification" International Telecommunication Union. Feb. 2004.*

U.S. Appl. No. 11/877,379, filed Oct. 23, 2007, Johnston et al.

ITU-T Telecommunication Standardization Sector of ITU—G.984.4 Amendment 1, Series G: Transmission Systems and Media, Digital Systems and Networks, Digital sections and digital line system—Optical line systems for local and access networks—Gigabit-capable Passive Optical Networks (G-PON): ONT management and control interface specification (2005).

ITU-T Telecommunication Standardization Sector of ITU—G.984.4 Amendment 2—Series G: Transmission Systems and Media, Digital Systems and Networks, Digital sections and digital line system—Optical line systems for local and access networks—Gigabit-capable Passive Optical Networks (G-PON): ONT management and control interface specification (2006).

ITU-T Telecommunication Standardization Sector of ITU—G.984.4 Amendment 3—Series G: Transmission Systems and Media, Digital Systems and Networks, Digital sections and digital line system—Optical line systems for local and access networks—Gigabit-capable Passive Optical Networks (G-PON): ONT management and control interface specification (2006).

ITU-T Telecommunication Standardization Sector of ITU—G.984.3 Amendment 1—Series G: Transmission Systems and Media, Digital Systems and Networks, Digital sections and digital line system—Optical line systems for local and access networks—Gigabit-capable Passive Optical Networks (G-PON): Transmission convergence layer specification (2005).

ITU-T Telecommunication Standardization Sector of ITU—G.984.3 Amendment 2—Series G: Transmission Systems and Media, Digital Systems and Networks, Digital sections and digital line system—Optical line systems for local and access networks—Gigabit-capable Passive Optical Networks (G-PON): Transmission convergence layer specification (2006).

ITU-T Telecommunication Standardization Sector of ITU—G.984.3 Amendment 3—Series G: Transmission Systems and Media, Digital Systems and Networks, Digital sections and digital line system—Optical line systems for local and access networks—Gigabit-capable Passive Optical Networks (G-PON): Transmission convergence layer specification (2006).

ITU-T Telecommunication Standardization Sector of ITU—G.984.3 Implementers' Guide—Series G: Transmission Systems and Media, Digital Systems and Networks—Gigabit-capable Passive Optical Networks (G-PON): Transmission convergence layer specification (2006).

ITU-T Telecommunication Standardization Sector of ITU—G.984.2—Series G: Transmission Systems and Media, Digital Systems and Networks, Digital sections and digital line system—Optical line systems for local and access networks—Gigabit-capable Passive Optical Networks (G-PON): Physical Media Dependent (PMD) layer specification (2003).

ITU-T Telecommunication Standardization Sector of ITU—G.984.2 Amendment 1—Series G: Transmission Systems and Media, Digital Systems and Networks, Digital sections and digital line system—Optical line systems for local and access networks—Gigabit-capable Passive Optical Networks (G-PON): Physical Media Dependent (PMD) layer specification (2006).

ITU-T Telecommunication Standardization Sector of ITU—G.984.1—Series G: Transmission Systems and Media, Digital Systems and Networks, Digital sections and digital line system—Optical line systems for local and access networks—Gigabit-capable Passive Optical Networks (G-PON): General Characteristics.

ITU-T Telecommunication Standardization Sector of ITU—G.983.4—Series G: Transmission Systems and Media, Digital Systems and Networks, Digital sections and digital line system—Optical line systems for local and access networks—a broadband optical access system with increased service capability using dynamic bandwidth assignment (2001).

ITU-T Telecommunication Standardization Sector of ITU—G.983.4 Amendment 1—Series G: Transmission Systems and Media, Digital Systems and Networks, Digital sections and digital line system—Optical line systems for local and access networks—a broadband optical access system with increased service capability using dynamic bandwidth assignment (2003).

ITU-T Telecommunication Standardization Sector of ITU—G.983.4 Corrigendum 1—Series G: Transmission Systems and Media, Digital Systems and Networks, Digital sections and digital line system—Optical line systems for local and access networks—a broadband optical access system with increased service capability using dynamic bandwidth assignment (2005).

ITU-T Telecommunication Standardization Sector of ITU—G.652—Series G: Transmission Systems and Media, Digital Systems and Networks, Transmission media characteristics—Optical fibre cables—Characteristics of a Single-Mode Optical Fibre and Cable (2005).

ITU-T Telecommunication Standardization Sector of ITU—I.363.1—Series I: Integrated Services Digital Network, Overall network aspects and functions—Protocol layer requirements—B-ISDM ATM Adaptation Layer Specification: Type 1 AAL (1996).

ITU-T Telecommunication Standardization Sector of ITO—I.363.2—Series I: Integrated Services Digital Network, Overall network

(56) References Cited

OTHER PUBLICATIONS aspects and functions—Protocol layer requirements—B-ISDN ATM Adaptation Layer Specification: Type 2 AAL (2000).
ITU-T Telecommunication Standardization Sector of ITU—1.363.3—Series 1: Integrated Services Digital Network, Overall network aspects and functions—Protocol layer requirements—B-ISDN ATM Adaptation Layer Specification: Type 3/4 AAL (1996).
ITU-T Telecommunication Standardization Sector of ITU—1.363.5—Series I: Integrated Services Digital Network, Overall network aspects and functions—Protocol layer requirements—B-ISDN ATM Adaptation Layer Specification: Type 5 AAL (1996).
Office action for U.S. Appl. No. 11/877,379 dated Dec. 23, 2009.
Office Action in U.S. Appl. No. 11/877,379, dated Jun. 22, 2010.
Office Action in U.S. Appl. No. 11/877,379, dated Mar. 11, 2011.
Office Action in U.S. Appl. No. 11/877,379, dated Sep. 7, 2011.
Office Action in U.S. Appl. No. 11/938,719, dated Aug. 13, 2010.
Office Action in U.S. Appl. No. 11/938,719, dated Jan. 4, 2011.
Office Action in U.S. Appl. No. 11/877,379, dated Dec. 8, 2011.
AMCC, "High Definition Serial Digital Interface (HD-SDI) Chipset," 18 pages (Dec. 10, 1999).
Office Action in U.S. Appl. No. 11/877,379, dated Jul. 11, 2012 (44 pages).
Office Action in U.S. Appl. No. 11/877,379, dated Oct. 26, 2012 (44 pages).
Office Action in U.S. Appl. No. 11/877,379, dated Apr. 26, 2013 (46 pages).
Notice of Allowance in U.S. Appl. No. 11/877,379, dated Dec. 23, 2013 (10 pages).
Office Action in U.S. Appl. No. 11/939,513, dated Oct. 1, 2010 (10 pages).
Notice of Allowance in U.S. Appl. No. 11/939,513, dated Feb. 8, 2011 (4 pages).
Office Action in U.S. Appl. No. 11/938,019 dated Jul. 13, 2010 (6 pages).
Office Action in U.S. Appl. No. 11/938,019 dated Dec. 21, 2010 (6 pages).
Notice of Allowance in U.S. Appl. No. 11/938,019 dated Mar. 25, 2011 (5 pages).
Office Action in U.S. Appl. No. 11/948,575 dated Dec. 6, 2010 (7 pages).
Office Action in U.S. Appl. No. 11/948,575 dated Aug. 3, 2011 (10 pages).
Notice of Allowance in U.S. Appl. No. 11/948,575 dated Feb. 7, 2012 (7 pages).
Office Action in U.S. Appl. No. 13/195,197 dated Aug. 8, 2012 (7 pages).
Notice of Allowance in U.S. Appl. No. 13/195,197 dated Nov. 29, 2012 (5 pages).
Office Action in U.S. Appl. No. 13/523,610 dated Mar. 28, 2013 (12 pages).
Office Action in U.S. Appl. No. 13/523,610 dated Aug. 19, 2013 (13 pages).
Office Action in U.S. Appl. No. 13/523,610 dated Aug. 19, 2013 (3 pages).
Office Action in U.S. Appl. No. 13/523,610 dated Mar. 26, 2014 (12 pages).
Notice of Allowance in U.S. Appl. No. 13/523,610 dated Aug. 13, 2014 (5 pages).
Office Action in U.S. Appl. No. 11/938,707 dated Oct. 27, 2011 (30 pages).
Office Action in U.S. Appl. No. 11/938,707 dated Nov. 1, 2010 (24 pages).
Office Action in U.S. Appl. No. 11/938,707 dated Apr. 15, 2011 (26 pages).
Office Action in U.S. Appl. No. 11/938,707 dated May 25, 2012 (36 pages).
Office Action in U.S. Appl. No. 11/938,707 dated Dec. 21, 2012 (34 pages).
Notice of Allowance in U.S. Appl. No. 11/938,707 dated Sep. 16, 2013 (17 pages).
Notice of Allowance in U.S. Appl. No. 11/938,719, dated Apr. 21, 2011 (5 pages).
IEEE Std P802.11-REVma/06.0, (Revision of IEEE Std 802.11-1999) "Unapproved Draft Standard for Information Technology-Telecommunications and information exchange between systems-Local and metropolitan area network-Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).
IEEE Std 802.Nov. 2007 (revision of IEEE Std. 802.11-1999) "Information Standard for Information technology—Telecommunications and information exchange between systems—Local and metropolitan area networks - Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).
IEEE Std 802.16e-2005 and IEEE Std 802.16/2004/Cor1-2005 (Amendment and Corrigendum to IEEE Std 802.16/2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).
Chen, "Home Network Basis: Transmission Environments and Wired/Wireless Protocols," *Prentice Hall*, pp. 1-26 (Jul. 2003).
Mujtaba, "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).

\* cited by examiner

OPTICAL LINE TERMINATION IN A PASSIVE OPTICAL NETWORK

CROSS-REFERENCES TO RELATED APPLICATIONS

The present application claims the benefit of U.S. Provisional Application No. 60/867,504, entitled "OLT ARCHITECTURE OVERVIEW," filed on Nov. 28, 2006, which is hereby incorporated by reference herein in its entirety.

FIELD OF TECHNOLOGY

The present disclosure relates generally to line termination in point-to-multipoint networks, and more particularly, to optical line termination in a gigabit passive optical network.

DESCRIPTION OF THE RELATED ART

In point-to-multipoint networks, such as passive optical networks, the upstream and downstream transmissions are based on a transmission convergence frame format. The frame format generally includes an overhead field and a payload field. An optical line termination (OLT) unit provides an interface between the passive optical network and the backbone network of a service provider. The OLT is responsible managing optical network termination (ONT) units in the passive optical network, including allocation of bandwidth, ranging, physical layer operations and maintenance, etc., in addition to providing downstream content to the ONTs.

The upstream and downstream transmissions involve both time-sensitive (low latency) and non-time sensitive data. The time-sensitive functions generally require processing within a short and guaranteed time duration, which may be of particular importance for transmissions such as telephony or video/audio broadcast services. For example, processing frame formats to provide the payload data to a client or assembling a frame format for transmission should involve as little delay and jitter as possible. However, non-time sensitive functions may include added delay and jitter versus time-sensitive functions.

SUMMARY OF THE DISCLOSURE

In one embodiment, a line termination unit integrated circuit in a point-to-multipoint network comprises a receiver to receive an upstream transmission from a network termination unit within the point-to-multipoint network, where the upstream transmission comprises an upstream transmission convergence frame format having an overhead field and a payload field, a transmitter to transmit a downstream transmission to a network termination unit within the point-to-multipoint network, where the downstream transmission comprises a downstream transmission convergence frame format having an overhead field and a payload field, and an internal processor to process sub-fields within the overhead field of the upstream transmission and to assemble the overhead field of the downstream transmission.

In another embodiment, a passive optical line termination device comprises a system-on-a-chip (SoC) subsystem having an SoC processor and a memory interface operatively coupled to the processor, a memory operatively coupled to the memory interface, and an integrated circuit having a distributed direct memory access engine operatively coupled to the SoC processor and the memory interface to interconnect the integrated circuit with the SoC sub-system and to directly access the memory. The distributed direct memory access engine includes a system-on-a-chip (SoC) interface, a first direct memory access engine operatively coupled to the SoC interface to read data from the memory, and a second direct memory access engine operatively coupled to the SoC interface to write data to the memory.

In yet another embodiment, a method of processing an upstream transmission within a passive optical network (PON) chip of an optical line termination unit in a passive optical point-to-multipoint network comprises receiving an upstream transmission from a network termination unit within the passive optical point-to-multipoint network, processing an overhead field of the upstream transmission within the passive optical network chip, recovering a data frame from a payload field of the upstream transmission within the passive optical network chip, and providing the recovered data frame to a packet buffer external to the passive optical network chip. Processing an overhead field of the upstream transmission within the passive optical network chip may include determining the transmission rate of the upstream transmission and recovering a transmission clock associated with the upstream transmission, recovering a delimiter within the overhead field and determining the location of the upstream transmission based on the delimiter, descrambling the upstream transmission, recovering a bit interleaved parity from the overhead field of the upstream transmission and comparing the recovered bit interleaved parity to an internally determined bit interleaved parity to measure an error in the transmission, processing a cyclic redundancy check from the overhead field of the upstream transmission, filtering physical layer operations and maintenance messages within the overhead field of the upstream transmission, and/or executing bandwidth control.

In still another embodiment, a method of processing a downstream transmission within a passive optical network (PON) chip of an optical line termination unit in a passive optical point-to-multipoint network comprises receiving packet data from a packet buffer external to the passive optical network chip, assembling an overhead field of the downstream transmission within the passive optical network chip, assembling a payload field of the downstream transmission from the packet data within the passive optical network chip, and transmitting a downstream transmission frame comprising the overhead field and the payload field to a network termination unit within the point-to-multipoint network. In one example, assembling an overhead field may include inserting the overhead in parallel with assembling a payload field of the downstream transmission from the packet data, multiplexing the assembled overhead field and the assembled payload field with a bit interleaved parity, forward error encoding the multiplexed overhead field, payload field and bit interleaved parity, scrambling the forward error encoded overhead field, payload field and bit interleaved parity and/or generating a bit interleaved parity for a subsequent downstream transmission frame based on the forward error encoded overhead field, payload field and bit interleaved parity. In another example, assembling an overhead field may include generating information for each of a plurality of sub-fields of the overhead field. Generating information for each of a plurality of sub-fields of the overhead field may include generating a synchronization field for the network termination unit to identify the beginning of the downstream transmission frame and establish synchronization with the downstream transmission frame, generating a bandwidth allocation for upstream transmissions from the network termination unit, generating an identification field to indicate large frame structures to the network termination unit, and generating a payload length field to indicate the size of the payload to the network termination unit. In another example, generating information for each of a plurality of sub-fields of the overhead field may include generating a physical layer operations and maintenance field requesting a physical layer operations and maintenance message from the network termination unit, and/or inserting a cyclical redundancy check field for error detection and correction by the network termination unit.

DETAILED DESCRIPTION

Figure 1:
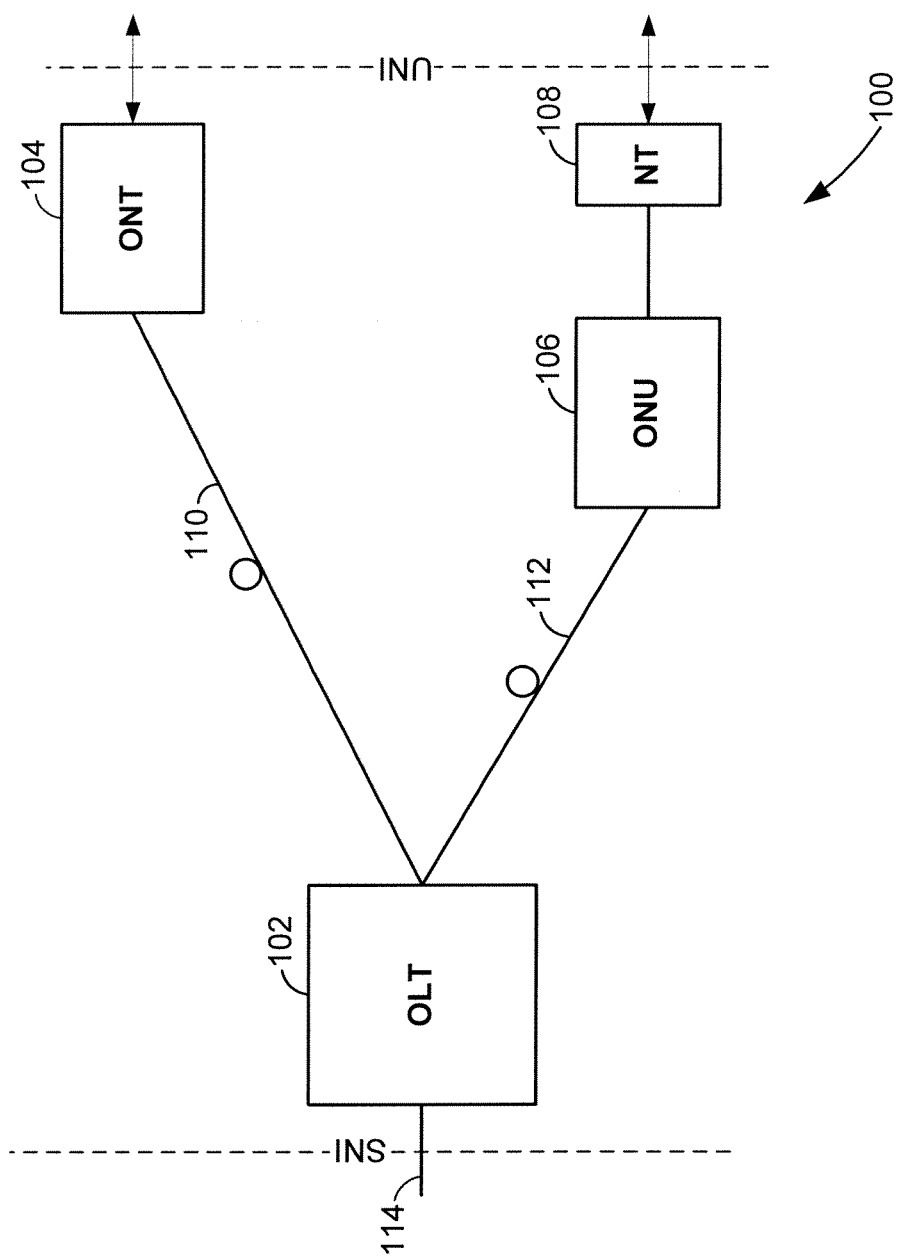
FIG. 1 a block diagram of a passive optical network.

FIG. 1 is a block diagram of an example passive optical network 100 that includes an optical line termination (OLT) 102 coupled to an optical network terminal (ONT) 104 and an optical network unit (ONU) 106. Generally, the passive optical network 100 is a point-to-multipoint network, where the OLT 102 is provided as a service node interface, for example at a server or service provider, such as an internet service provider, television service provider, telephony service provider or other provider of network services. The ONT 104 and/or ONU 106 are each provided as an user node interface, for example at or near an end user. While the OLT 102 may be provided at the service provider site, the OLT 102 may also be provided as one of several OLTs within a distributed network, where each OLT is associated with corresponding ONUs 106 and/or ONTs 104.

As shown in FIG. 1, the OLT 102 is communicatively coupled to the ONT 104 via an optical fiber 110, and communicatively coupled to the ONU 106 via an optical fiber 112. The optical fibers 110, 112 may be part of an optical distribution network (ODN). Although only one ONT 104 and one ONU 106 are shown to be communicatively coupled to the OLT 102, it should be understood that in a point-to-multipoint optical network, optical fibers may be each be run, one-to-one from the OLT 102 to an ONT 104 and/or an ONU 106, where there may be multiple ONTs 104 and/or ONUs 106 in the passive optical network 100 each of which may, in turn, service multiple end users. As such, a single OLT 102 may service multiple end users on the same or a few optical fibers. As is understood, both the ONT 104 and the ONU 106 operate to terminate the passive optical network 100. An ONT 104 may refer to an integrated unit for an end user that presents the services of the service provider to the end user (e.g., video, data, telephony, etc.). An ONU 106 may be an optoelectronic interface to network termination (NT) equipment 108, where the ONU 106 terminates the passive optical network and the NT equipment 108 provides the services to the end user. The ONU 106 handles data packet conversion between the passive optical network 100 and the NT equipment 108, and the NT equipment 108 may provide an interface to the end user. While this disclosure references both ONTs 104 and ONUs 106, it should be understood that in the context of this disclosure, ONTs 104 and ONUs 106 may be treated similarly and these terms may be used interchangeably with optical network terminal generally referring to both ONTs 104 and ONUs 106.

Generally, the OLT 102 provides downstream broadcasts to each of the ONTs 104 and each of the ONUs 106 on different dedicated one-to-one fibers, where each ONT 104 and/or ONU 106 individually reads only the content of the transmissions intended for the particular ONT 104 and/or ONU 106. The ONTs 104 and the ONUs 106 provide upstream transmissions to the OLT 102 via their individual fibers in time division multiplexed (TDM) bursting mode. Communications between the OLT 102 and the ONT 104 or ONU 106 generally utilize wavelength division multiplexing with the downstream broadcasts utilizing one wavelength and upstream transmissions utilizing another wavelength. Although the passive optical network 100 is described as having one-to-one fibers between the OLT 102 and the ONTs/ONUs 104, 106, it should be understood that multiple fibers may be utilized in the one-to-one correspondence between the OLT 102 and each corresponding ONT/ONU 104, 106. In one example, each connection between the OLT 102 and the ONTs/ONUs 104, 106 may utilize two fibers, with one for upstream transmissions and one for downstream transmission, rather than wavelength division multiplexing signals that share the same fiber.

The OLT 102 provides a variety of functions within the passive optical network 100. At one level, the OLT 102 provides the interface 114 between the passive optical network 100 and a backbone network of the service provider network, which may include supporting time division multiplexed (TDM) protocols at different rates of speed, internet protocol (IP) traffic, asynchronous transfer mode (ATM) protocols, etc. The OLT 102 further facilitates both upstream and downstream communication between the service provider and the ONTs 104 and ONUs 106, and between ONTs 104 and ONUs 106. For example, the OLT 102 allocates upstream bandwidth to the ONTs 104 and ONUs 106 by granting intervals of time (e.g., time slot assignments) to each of the ONTs 104 and ONUs 106 to transmit upstream communications without collisions on the fiber. Upstream bandwidth allocation may be fixed for ONTs 104 or ONUs 106 requiring continuous (e.g., guaranteed) bandwidth availability. For ONTs 104 or ONUs 106 that do not require continuous bandwidth availability (e.g., burst transmissions), the OLT 102 may utilize dynamic bandwidth allocation (DBA) based on either polling bandwidth information from the ONTs 104 and ONUs 106 or based on the occurrence of idle gigabit passive optical network (GPON) encapsulation method (GEM) frames from the ONTs 104 or ONUs 106. In addition, the ONTs 104 and ONUs are typically provided at different distances from the OLT 102, and the OLT 102 utilizes a ranging protocol to equalize the optical path length and equalize the transmission delay between the OLT 102 and the various ONTs 104 and ONUs 106. For example, the OLT 102 may measure the transmission delay for each ONT 104 and ONU 106, and transmits a physical layer operations and maintenance (PLOAM) message to set the transmission delay in the ONT 104 or ONU 106. The OLT 102 further provides centralized media access control (MAC) for the passive optical network 100 for purposes of upstream bandwidth allocation.

Upstream and downstream transmissions between the OLT 102 and the ONTs 104 or ONUs 106 may be performed in a transmission convergence frame format, whereby the transmission data, regardless of the services being provided, is encapsulated in the same type of data packet for transmission over the passive optical network 100. In particular, the transmissions between the OLT 102 and the ONTs 104 or ONUs 106 may take advantage of the gigabit passive optical network (GPON) standard developed by the International Telecommunications Union (ITU). The GPON standard is also known as ITU-T G.984. As is known, the GPON standard generally provides greater security as compared to previous standards, greater bandwidth, larger variable-width data packets, higher data rates and supports various Layer 2 protocols including ATM and GPON encapsulation method (GEM).

Although the disclosure generally refers to a gigabit passive optical network (GPON), it should be understood that all or part of this disclosure may be equally applicable to, or supportive of, previous-generation passive optical network standards, such as asynchronous transfer mode (ATM) passive optical network (APON) and broadband passive optical network (BPON), current passive optical network standards, such as Ethernet passive optical network (EPON), and future passive optical network standards, such as wavelength division multiplex passive optical network (WDM-PON). The disclosure may also be equally applicable to variations on the GPON standard.

Figure 2:
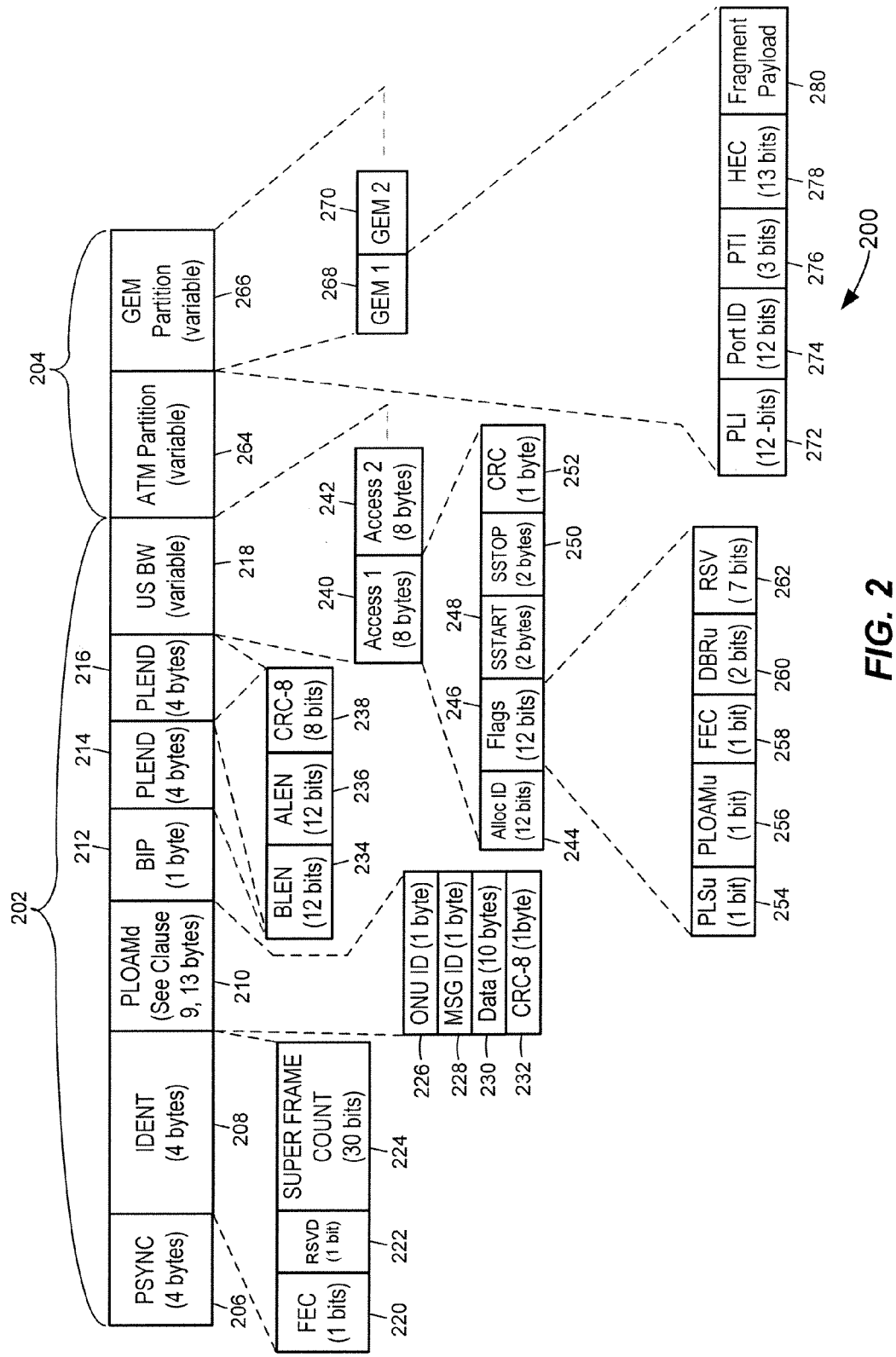
FIG. 2 is a schematic diagram of a downstream gigabit passive optical network transmission convergence frame format.

FIG. 2 is an example of a downstream transmission convergence layer (TC-Layer) frame format 200 using the GPON standard and which may be utilized for downstream transmissions from the OLT 102 to the ONTs 104 and ONUs 106. The downstream frame format 200 generally includes an overhead field 202 and a payload field 204, where the overhead field 202 includes several sub-fields to be assembled by the OLT 102 and the payload field 204 includes the information being sent to the ONT 104 or ONU 106 (e.g., service data). As indicated above, the data for the payload field 204 may be provided in one or more transport formats, such as ATM or GEM, and as a variable length data packet. As also indicated above, while the following disclosure involves an example of the downstream transmission convergence layer (TC-Layer) frame format 200, as well as the subsequent upstream transmission convergence layer (TC-Layer) frame format discussed further below, it should be understood that variations of the downstream and upstream formats may occur and the disclosure is not limited to the particulars examples given herein.

The overhead field 202 for the downstream transmission frame may be referred to as the physical control block downstream (PCBd), and may include a physical synchronization (PSYNC) field 206, an identification (Ident) field 208, a physical layer operations and maintenance downstream (PLOAMd) field 210, a bit interleaved parity (BIP) field 212, two payload length downstream (PLEND) fields 214, 216 and an upstream bandwidth map (US BWmap) field 218. The PSYNC field 206 is a fixed pattern that generally begins the overhead field 202, such that an ONT 104 or ONU 106 may use the PSYNC field 206 to identify the beginning of the frame 200 and establish synchronization with the downstream transmission. When the ONT 104 or ONU 106 finds the PSYNC field 206 within a frame of a downstream transmission from the OLT 102, the ONT/ONU 104, 106 may utilize a synchronization state machine, or other synchronization method, and search for other PSYNC fields 206 within subsequent frames to establish and monitor the synchronization state with the transmission. In one example, a counter may be set upon identifying a unique value in the PSYNC field 206, with the counter being incremented for each valid PSYNC field 206 read by the ONT/ONU 104, 106. Once the counter reaches a predetermined threshold, the ONT/ONU 104, 106 is able to enter into a synchronization state whereby the ONT/ONU 104, 106 is in synchronization with the downstream transmission rate. The ONT/ONU 104, 106 may thereby determine it has discovered the downstream frame structure and begin to process the overhead information. The ONT/ONU 104, 106 may also maintain a count for invalid or incorrect PSYNC fields 206, and if the incorrect count reaches a predetermined threshold, the ONT/ONU 104, 106 may determine that it has lost the downstream frame structure and repeat the search for a valid or correct PSYNC field 206. However, it should be understood that different state machines or different manners of establishing and monitoring synchronization with the transmission may be utilized.

The Ident field 208 may be used to indicate large frame structures (superframes) within the downstream transmission frame, and which may be used to control data encryption. Generally, the Ident field 208 includes an FEC field 220, a reserved field 222 and a superframe counter 224. The FEC field 220 indicates whether forward error correction (FEC) is being is being enabled on the present downstream frame and may be used for FEC control. As is known, forward error correction is a method of error control for transmissions, where the OLT 102 may add redundant data to the downstream transmission frame, and the ONT/ONU 104, 106 may detect and correct errors using the redundant data, thereby avoiding retransmission of the downstream transmission frame from the OLT 102. The reserved field 222 is reserved for other purposes, and the superframe counter 224 provides error checking for potential dropped frames. The ONT/ONU 104, 106 loads the superframe counter value and compares its local expected value with the superframe counter value, whereby a match indicates correct synchronization and a mismatch indicates a transmission error or desynchronization.

The PLOAMd field 210 contains a downstream PLOAM message from the OLT 102 for the ONT/ONU 104, 106. A PLOAM message is generally a control message that may relate to a variety of information or instructions for the ONT/ONU 104, 106, including, but not limited to, alerts, activation-related messages, instructions, etc. For example, an Upstream_Overhead PLOAM message may instruct the ONT/ONU 104, 106 to use a particular preassigned equalization delay during ranging and number of preamble bytes for upstream transmissions, define the transmission power of the ONT/ONU 104, 106. A Serial_number_mask PLOAM message may provide a serial number and a mask for part of the serial number. An Assign ONU-ID PLOAM message may assign an identification with the serial number of the ONT/ONU 104, 106. A Ranging Time PLOAM message may provide a value for an equalization delay register of the ONT/ONU 104, 106. A Deactivate_ONU-ID PLOAM message may provide a deactivation/reset instruction to stop sending upstream transmissions. A Disable_serial_number PLOAM message may provide a disable/enable instruction to an ONT/ONU 104, 106. A Configure_VP/VC PLOAM message may activate or deactivate a virtual channel or a virtual path at the ATM layer. An Encrypted_Port-ID/VPI PLOAM message may indicate encrypted and unencrypted channels to the ONT/ONU 104, 106. A Request_password PLOAM message may request a password from the ONT/ONU 104, 106 for verification. An Assign_Alloc-ID PLOAM message may assign an allocation identification to an ONT/ONU 104, 106.

A POPUP PLOAM message may instruct the ONT/ONU 104, 106 to move to a ranging state or an operation state. A Request_Key PLOAM message may trigger the ONT/ONU 104, 106 to generate a new encryption key. A Configure Port-ID PLOAM message may link a management and control interface of the ONT/ONU 104, 106 (OMCI) with a Port-ID which may be appended to an overhead of GEM encapsulated payload to be used as an addressing mechanism to route the OMCI over the GEM channel. A PEE-Physical Equipment Error PLOAM message to indicate that the OLT is unable to sent both ATM cells, GEM frames and ONT/ONU 104, 106 Management and Control Channel (OMCC). A Change-Power-Level PLOAM message may trigger the ONT/ONU 104, 106 to increase or decrease it transmission power level. A PST (PON Section Trace) PLOAM message may be provided to check the connectivity between the ONT/ONU 104, 106 and the OLT, and to perform Automatic Protective Switching (APS). A BER interval PLOAM message may be provided to define the accumulation interval per ONT/ONU 104, 106 expressed as a number of downstream frames for the ONT/ONU 104, 106 counting the number of downstream bit errors. A Key Switching Time PLOAM message may indicate when the ONT/ONU 104, 106 when to begin using a new encryption key.

As seen in FIG. 2, the PLOAMd field 210 is formatted to include an ONU ID 226, a Message-ID 228, the message Data 230 and a cyclic redundancy check (CRC) 232. The ONU ID 226 identifies the ONT/ONU 104, 106 to receive the PLOAM message. The Message-ID 228 identifies the type of PLOAM message, example of which are provided above. The message Data 230 are used for the payload of the PLOAM message. The CRC 232 is a frame check sequence, such that the PLOAM message may be discarded upon receipt if the CRC is incorrect.

The BIP field 212 contains the bit interleaved parity of the bytes that have been transmitted since the previous BIP. The ONT/ONU 104, 106 independently determined the BIP and compares the result to the BIP field 212 to measure the number of errors in the transmission.

The Plend field 214, 216 specifies the length of the bandwidth map (BWmap) (also referred to as the bandwidth allocation) and any ATM partition in the payload 204. The BWmap length is provided in a Blen field 234, and the ATM partition length related information is provided in a Alen field 236. As seen in FIG. 2, the Plend field 214, 216 is a redundant field for error robustness. The Plend field 214, 216 may be protected by CRC (e.g., CRC-8) for error detection and correction as provide in a CRC field 238. In particular, the length of the bandwidth map provides the limit of the number of allocation IDs that may be granted in any particular duration in any 125 microsecond duration up to 4095. The actual length of the BWmap field 218 is then 8 times the Blen value. The Alen field 236 may allow up to a particular number of ATM cells in a frame (e.g., a 12-bit Alen field allows 4095 ATM cells), up to a particular data rate (e.g., 10 Gbits/s). The length of the ATM partition is then 53 times Alen. The ONT/ONU 104, 106 implements the error detection and correcting functions of the CRC field 238, decodes both copies of the Plend field 214, 216, and uses the copy based upon the result of the CRC detection process (e.g. the copy that is error free or that has a correctible error).

The US BWmap field 218 provides an upstream bandwidth allocation as processed by the OLT acting as the main or central controller for the ONTs 104 and ONUs 106. The BWmap field is provided as an array of allocation structures 240, 242 (Access1, Access2, etc.), where each entry in the array represents a single bandwidth allocation to a particular transmission container (T-CON). The number of entries in the BW map is provided in the Plend field 214, 216. The access fields are distributed to the ONT/ONU 104, 106 which become slaves to the OLT and are required to follow the provided format.

As shown in FIG. 2, each allocation structure 240, 242 includes an Alloc ID field 244, a Flags field 246, a SSTART field 248, a SSTOP field 250 and a CRC field 252. The Alloc ID field 244 indicated the particular T-CONT that is being granted time on the upstream, and includes an address of the ONT/ONU 104, 106 receiving the T-CONT.

The Flags field 246 contains five separate indications on how the allocation should be used by the ONT/ONU 104, 106, including information to be sent back to the OLT during the bandwidth allocation provided to the ONT/ONU 104, 106. The Flags field 246 includes a PLSu field 254, a PLOAMu field 256, an FEC field 258, a DBRu field 260 and an RSV field 262. The PLSu field 254 is a power leveling sequence used for power control measurements by the ONT/ONU 104, 106 which, if set, directs the ONT/ONU 104, 106 to send its PLSu information during the bandwidth associated allocation. If the PLSu bit is not set, the ONT/ONU 104, 106 does not send its PLSu information for the associated bandwidth allocation. The power control measurements function allows for adjustment of the power levels of the ONT/ONU 104, 106 to reduce the optical dynamic range as seen by the OLT, and is useful in initial power set-up of the ONT/ONU 104, 106 (e.g., during activation), and power mode change of the ONT/ONU 104, 106 transmitter (e.g., during activation or operation). The PlOAMu field 256 directs the ONT/ONU 104, 106 to send its PLOAMu information during the associated bandwidth allocation, if the bit is set. Examples of the PLOAM messages are discussed above. The FEC field 258 causes the ONT/ONU 104, 106 to compute and insert an FEC parity during the associated bandwidth allocation, if the bit is set. The DBRu field 260 causes the ONT/ONU 104, 106 to send an upstream Dynamic Bandwidth Report indicating the number of cells or blocks in the T-CONT buffer of the ONT/ONU 104, 106, whereby the OLT may determine the congestion status of each T-CONT. The RSV field 262 is reserved for future use.

The SSTART field 248 is the start time field indicating the starting time for upstream transmission (i.e., the starting time of the bandwidth allocation). The SSTOP field 250 is the stop time field indication the stop time for the upstream transmission. Each ONT/ONU 104, 106 uses the SSTART and SSTOP fields 248, 250 to determine when to start and stop its upstream transmission. Each ONT/ONU 104, 106 identifies which particular information among the allocation structures is for its own use as filtered through the Allocation ID 244 bits within the access portion of the frame. The CRC field 252 is a cyclic redundancy check (e.g., CRC-8) that protects each allocation structure, where the ONT's/ONU's 104, 106 BWmap field 218 processing implements error detecting and correcting functions of the CRC. If an uncorrectable error occurs as indicated by the CRC function, the allocation structure is discarded.

The transmission convergence payload field 204 may include both an ATM payload field 264 or partition, and a GEM payload field 266 or partition. As such, a variety of user data type may be carried in the GPON transmission convergence payload. The ATM partition 264 may contain a number of ATM cells, the length of which is provided in the Plend/Alen fields 214/236, 216/236. The OLT 102 may allocate as many cell durations as needed in the downstream, including almost all of the downstream frame. Generally, the ATM partition 264 is an integer multiple of 53 bytes long based upon the Plend/Alen fields 214/236, 216/236, and the ATM cells are aligned to the partition. The downstream cell stream is filtered at the ONT/ONU 104, 106 based upon a virtual path identifier (VPI) or virtual channel identifier (VCI). In particular, each ONT/ONU 104, 106 is configured to recognize which VPI belongs to it, and ATM cells that belong to the ONT/ONU 104, 106 are passed on to the ATM client process.

The GEM partition 266 contains a variable number of GEM frame-mode delineated frames 268, 270 (GEM1, GEM2, etc.). The length of the GEM partition 266 is determined based on whatever remains after the overhead 202 and ATM partitions 264 are subtracted from the overall frame length. The GEM protocol provides delineation of the user data frame (either going to or coming from a user) and provides port identification for multiplexing. Delineation and port identification are accomplished by the GEM header discussed below. The delineation process uses the GEM header at the beginning of every downstream GEM partition and every upstream GEM payload. As such, in a downstream transmission the ONT/ONU 104, 106 is assured of finding the first header and may find subsequent headers using the payload length identifier (PLI) as a pointer.

As seen in FIG. 2, each GEM frame 268, 270 includes a header containing a PLI field 272, a Port-ID field 274, a PTI field 276, HEC field 278, and a fragment payload 280. The PLI field 272 indicates the length of the fragment payload 280 following the header, and is used to identify the next header in the GEM stream to provide delineation. The size of the PLI field 272 (e.g., 12-bits) determines the size of the GEM fragments (e.g., up to 4095 bytes), where data frames larger than the GEM fragment payload size are fragmented into smaller sizes to accommodate the GEM fragment payload size. The Port-ID field 274 is a unique traffic identifier on the passive optical network 100 to provide traffic multiplexing. The PTI field 276 indicates the content type of the fragment payload 280 and how the fragment payload 280 should be treated (e.g., user data fragment; congestion has or has not occurred, end or not end of a frame). The PTI field 276 may be similar to that used in the ATM header. The PTI field 276 indicates which fragment contains the end of the user data frame. The downstream frame transmission is filtered at the ONT/ONU 104, 106 based upon the Port-ID field 274 contained in each GEM fragment. Frames belonging to the ONT/ONU 104, 106, each of which are configured to recognize which Port-IDs belong to it, are passed on to the GEM client process.

The HEC field 278 is header error control which provides error detection and correction functions for the GEM header. The GEM header may be provided at the beginning of each downstream GEM payload and the ONT/ONU 104, 106 uses the PLI field 272 to find the first header, and finds subsequent headers using the PLI as a pointer. The ONT/ONU 104, 106 may thereby transition to the "sync" state at the beginning of each partition and payload. If uncorrectable errors occur in the header as determined based on the HEC field 278, delineation of the GEM partition may lose synchronization with the data stream, and the ONT/ONU 104, 106 attempts to reacquire synchronization. The ONT/ONU 104, 106 searches for a GEM header HEC field 278, and when one is found, the ONT/ONU 104, 106 transitions to a pre-synchronized state, where it looks for the HEC field 278 at the location indicated in the previously found header. If the HEC matches, then the transition is made to the synchronized state. If it does not match, then the transition is made to the search for another HEC.

Figure 3:
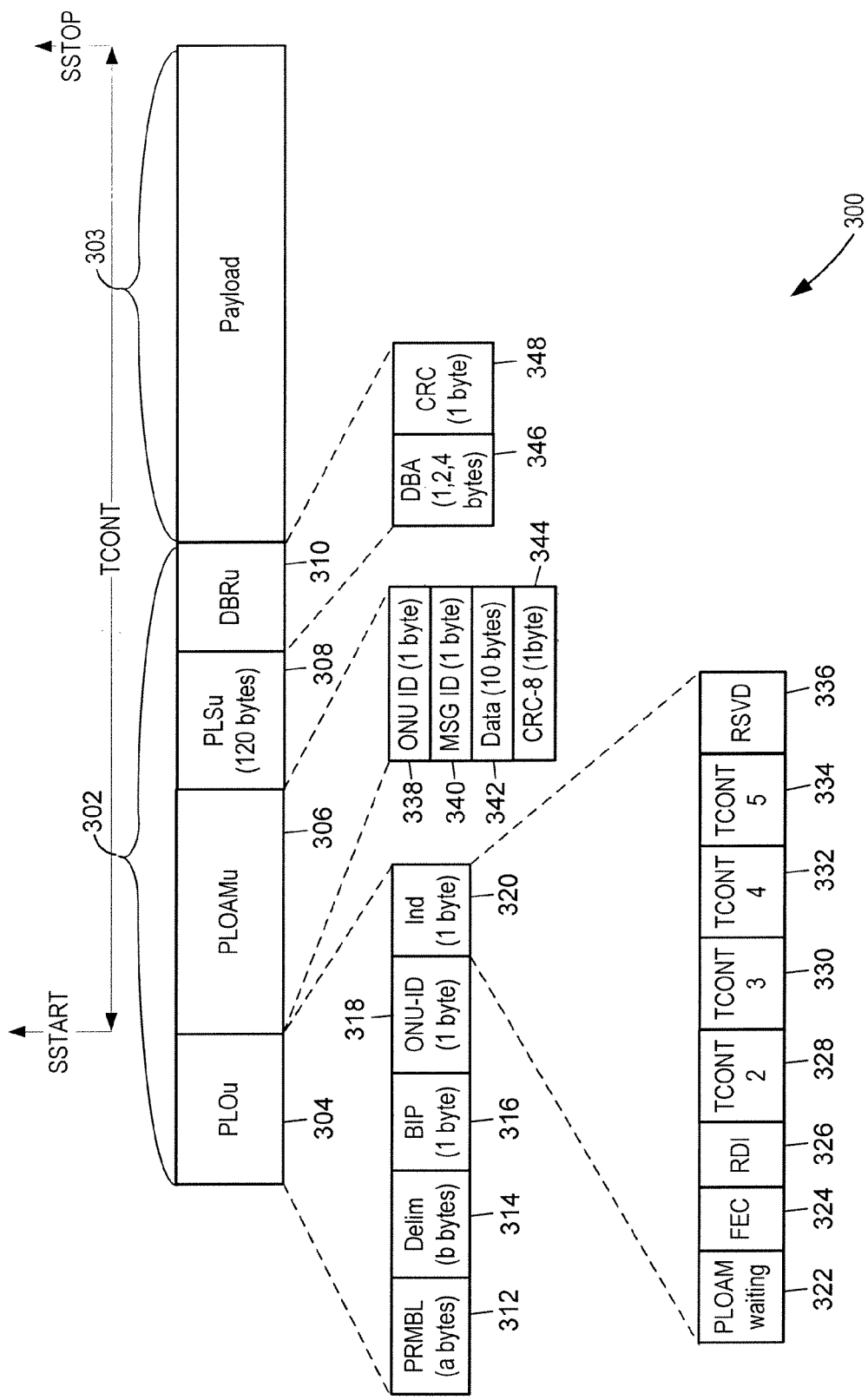
FIG. 3 is a schematic diagram of an upstream gigabit passive optical network transmission convergence frame format.

FIG. 3 is an example of an upstream transmission convergence layer (TC-Layer) frame format 300 using the GPON standard and which may be utilized for upstream transmissions from the ONTs 104 and/or ONUs 106 to the OLT 102. The upstream frame format 300 generally includes an overhead field 302 and a payload field 303. The overhead field 302 includes several sub-fields to be assembled by the ONT/ONU 104, 106 and processed by the OLT 102 and the payload field 303 includes the information being sent to the OLT 102 or to the service provider network. As indicated above, the data for the payload field 303 may be provided in one or more transport formats, such as ATM or GEM, and as a variable length data packet. The frame length of the upstream transmission convergence layer (TC-Layer) frame format 300 may be the same as that of the downstream transmission convergence layer (TC-Layer) frame format 200 for all transmission rates. Each frame may contain a number of transmissions from one or more ONT/ONU 104, 106, where the BWmap defines the arrangement of the transmissions. As seen in FIG. 3, the T-CONT of the upstream message is defined by the start and stop transmission times (SSTART and SSTOP) as determined by the OLT 102 during the downstream transmission, but does not include the PLOu field which is sent immediately prior to the start time pointer SSTART.

The overhead field 302 for the upstream transmission frame may include various types of overheads, including physical layer overhead (PLOu) 304, physical layer operations and management upstream (PLOAMu) 306, power leveling sequence upstream (PLSu) 308 and dynamic bandwidth report upstream (DBRu) 310. As discussed above, the Flag field 246 in the downstream transmission assembled by the OLT 102 indicates whether PLOAMu, PLSu or DBRu information should be sent from the ONT/ONU 104, 106 on each bandwidth allocation. The upstream frame is generally scrambled, and may be scrambled using a frame-synchronous scrambling polynomial.

The PLOu field 304 includes the physical layer overhead, which is provided as a preamble (PRMBL) field 312 and a delimiter (Delim) field 314. Three additional fields of data corresponding to the ONT/ONU 104, 106 as a whole are also provided: a bit interleaved parity (BIP) field 316, a ONT/ONU 104, 106 identification (ONU-ID) field 318 and an indication (Ind) field 320. The above data is generally provided at the beginning on any transmission burst from an ONT/ONU 104, 106. The status of the PLOu information is given by the arrangement of the bandwidth allocations. Every time an ONT/ONU 104, 106 takes over the passive optical network 100 from another ONT/ONU 104, 106, the ONT/ONU 104, 106 sends a new copy of the PLOu data. The GPON transmission convergence layer sources the PLOu 304. The preamble field 312 is used to synchronize the OLT 102 to the incoming message, and the delimiter field 314 is used by the OLT 102 to identify where the first bit of information in the frame begins. The preamble field 312 and the delimiter field 314 are formed as determined by the OLT in the Upstream_Overhead PLOAM message discussed above. As seen in FIG. 3, the preamble and delimiter fields 312, 314 are transmitted before the allocation start time SSTART pointer, as previously dictated by the OLT.

The BIP field 316 contains the bit interleaved parity of the bytes transmitted since the last BIP from the transmitting ONT/ONU 104, 106, excluding those of the preamble and delimiter fields 312, 314. The OLT 102 computes the bit-interleaved parity for each ONT/ONU 104, 106 burst, and compares the result to the BIP of the BIP field 316 to measure the number of errors in the link. The ONU-ID field 318 contain the unique identification of the transmitting ONT/ONU 104, 106. The ONU-ID is generally assigned to the ONT/ONU 104, 106 during the ranging process.

The Ind field 320 provide a real-time ONT/ONU 104, 106 status report to the OLT. As shown in FIG. 3, the format of the Ind field 320 is provided as a PLOAM waiting field 322 indicating if one or more PLOAM messages are waiting, an FEC field 324 indicating if forward error correction is enabled or not, a remote defect indication (RDI) field 326 indicating if a defect occurred or not, traffic waiting indicator fields for type 2 T-CONTs 328, type 3 T-CONTs 330, type 4 T-CONTs 332 and type 5 T-CONTs 334, as well as reserved bits 336. If the PLOAM waiting field 322 indicated an urgent PLOAM message is waiting, the OLT 102 may issue an upstream allocation that allows the ONT/ONU 104, 106 to send the PLOAM message in a timely manner. Further uses of the Ind field 320, and in particular the T-CONT fields 328, 330, 332, 334, are discussed below in relation to the DBRu field 310.

Examples of the PLOAM messages as provided in the PLOAMu field 306 are discussed above, and may be provided by the transmitting ONT/ONU 104, 106 in response to a corresponding request from the OLT 102. In particular, the PLOAMu field 306 may only be sent when indicated by the Flags field 246. The PLOAMu field 306 may have a similar structure as the PLOAMd field 210, including an ONU ID 338 of the transmitting ONT/ONU 104, 106, a Message-ID 340 identifying the type of PLOAM message, the message Data 342 for the payload of the message, and a cyclic redundancy check (CRC) 344 to detect and correct errors in the header fields 338, 340, 342.

The PLSu field 308 is used for power control measurements by the ONT/ONU 104, 106 and adjusts the ONT/ONU 104, 106 power levels to reduce the optical dynamic range seen by the OLT. The content of the PLSu field 308 is generally set by the ONT/ONU 104, 106, and is sent by the ONT/ONU 104, 106 when indicated in the Flags field 246 of a downstream transmission from the OLT 102. For example, the OLT 102 may set the PLSu bit on broadcast allocation to allow the ONT/ONU 104, 106 to set up its transmitter during the activation process. If the ONT/ONU 104, 106 does not use the PLSu field 308, the ONT/ONU 104, 106 may deactivate its transmitter for that time. During operation of the ONT/ONU 104, 106, the ONT/ONU 104, 106 generally transmits following the PLSu field 308 such that the ONT/ONU 104, 106 sends the PLSu field 308 when it is requested by the OLT regardless of any need to perform transmitter adjustment.

The DBRu field 310 includes information that is associated with the T-CONT entity, rather than the ONT/ONU 104, 106. The DBRu field 310 is sent when requested by the OLT in the Flags field 246 of a downstream transmission. The DBRu field 310 includes a dynamic bandwidth allocation (DBA) field 346 and a CRC field 348. The DBA field 346 contains the traffic status of the particular T-CONT, and may be used by the OLT 102 for bandwidth allocation for the ONT/ONU 104, 106. The DBA field 346 may be supported via status reporting and OLT traffic monitoring for those ONT/ONU 104, 106 that do not report status. Status reporting DBA field 346 may be provided as status indications in the PLOu, in the DBRu as shown in FIG. 3, or in an ONU report in a DBA payload.

Status indications may be carried as four bits in the PLOu Ind field 320, and provide a report for each type of T-CONT 328, 330, 332, 334. Each bit may correspond to a different T-CONT type. If a bit is set for a particular T-CONT type 328, 330, 332, 334, the OLT 102 may assume there is some data waiting in one of the T-CONT buffers of that type. It is noted that T-CONT types 2, 3 and 4 328, 330, 332 may not have a fixed bandwidth component and any data waiting in those T-CONTs 328, 330, 332 causes the corresponding indicator to be set, whereas a T-CONT type 5 field 334 buffer may contain data belonging to a fixed bandwidth such that the presence of non-fixed bandwidth sets the corresponding indicator. The status indications provide an early warning to the OLT 102 that data is waiting, though it is not required that the OLT 102 DBA algorithm wait for such indications before allocating bandwidth to the ONT/ONU 104, 106 in order to avoid unnecessary delays. The OLT 102 may use the status indications for a fast alert that DBA supervision may be needed at the ONT/ONU 104, 106 without identifying the T-CONT 328, 330, 332, 334 or bandwidth detail.

Status reporting DBA in the DBRu field 310, shown in FIG. 3 as the DBA field 346, provides a continuous update of the traffic status of a particular T-CONT and is carried in the DBRu field 310 associated with the T-CONT. The status report in the DBA field 346 specifies the amount of data waiting in the T-CONT buffer corresponding to the allocation identification (Alloc-ID) that triggered the DBRu transmission. The OLT 102 may trigger the transmission of the DBRu by setting the DBRu field 260 in the Flags field 246 of a downstream transmission. The CRC field 348 protects the report in the DBA field 346 and DBRu structure with error correction and detection. The OLT may implement the error detecting and correcting functions associated with the CRC field 348 (e.g., CRC-8). If the CRC function indicates an uncorrectable error, the information in the DBRu field 310 may be discarded.

An ONU report in a DBA payload allows for the ONT/ONU 104, 106 to send a DBA report on any T-CONT in the transmission, and is carried in a dedicated DBA payload partition allocated by the OLT in the upstream. The ONT/ONU 104, 106 may select the T-CONT that is the subject of the report, and allows the OLT 102 to schedule a DBA payload which is generally smaller that that required to report on all the T-CONTs in the ONT/ONU 104, 106.

The upstream payload field 303 may be used to carry ATM cells, GEM-delineated frames or DBA reports. The ATM upstream payload includes a number of ATM cells from the ONT/ONU 104, 106 to the OLT 102, and the length of the payload is given by the duration of the allocation minus the size of any requested overhead. The ONT/ONU 104, 106 may buffer the ATM cells as they are provided by the OLT 102 and send them in burst during the allocated time. The OLT 102 receives the ATM cells, and may multiplex them with other bursts from other ONT/ONU 104, 106 and pass them to the OLT ATM client. The GEM payload contains any number of GEM frame-mode delineated frames, and the length of the payload is also given by the duration of the allocation minus the size of any requested overhead. The GEM protocol provides delineation of the user data frame (either going to or coming from a user) and provides port identification for multiplexing. As discussed above, delineation and port identification are accomplished by a GEM header, where the delineation process uses the GEM header at the beginning of every upstream GEM payload. As such, in an upstream transmission the OLT 102 is assured of finding the first header and may find subsequent headers using the PLI as a pointer. The DBA payload is discussed above, and contains a group of dynamic bandwidth allocation reports from the ONT/ONU 104, 106.

Figure 4A:
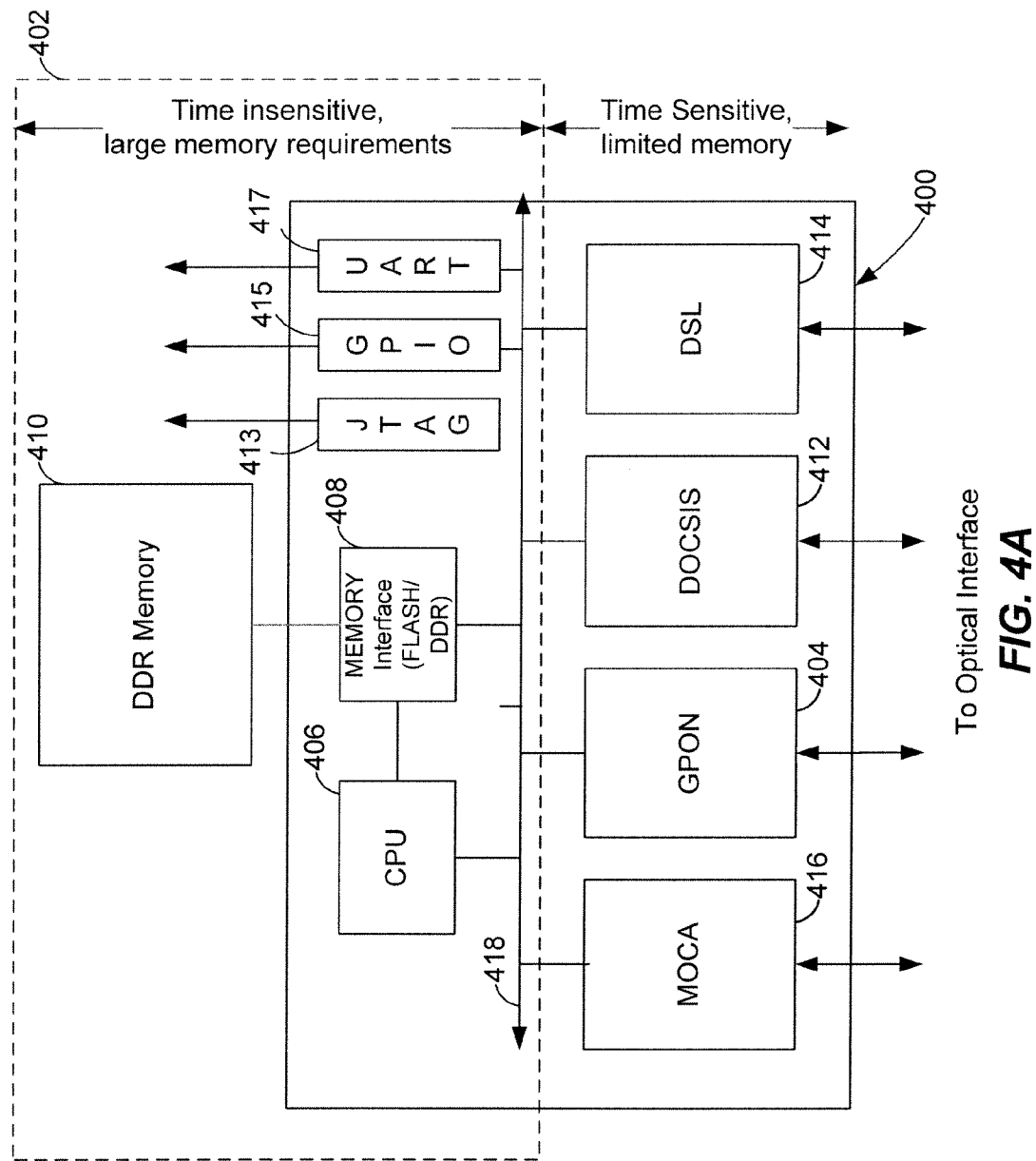
FIG. 4A is a block diagram of an example architecture of an integrated circuit within a passive optical network line termination unit.

FIG. 4A is a block diagram indicating an example of an architecture 400 that may be implemented in the OLT 102 to divide and execute time sensitive functions from non-time sensitive functions. Generally, the architecture 400 includes a sub-system 402 which may be used to execute non-time sensitive functions, such as those that require large memory requirements or low latency, and integrated circuits 404 having an embedded processor for performing time-sensitive functions, such as those that may only need limited memory. Time-sensitive versus non-time sensitive functions may be determined based on time threshold or response threshold requirements for processing the functions. For example, some functions, such as Media Access Control (MAC), may require immediate response (i.e., fast response threshold, time sensitive), whereas other functions, such as TCP/IP routing or packet processing, may not require an immediate response (i.e., non-time sensitive). It is recognized that in practice the actual response time for some non-time sensitive functions may be comparable to the response time threshold of time-sensitive functions. However, it should be understood that it is the response time requirements (e.g., time threshold requirements) that establish whether a function is time-sensitive or not, rather than the actual response time seen in practice. As such, the time threshold requirements delineating between time-sensitive and non-time sensitive are not necessarily predetermined or static, but are rather based on the allowable response time for executing the function.

As will be apparent from the discussions below in regards to FIGS. 5A-5D, the integrated circuit 404 may perform a variety of time-sensitive functions depending on the information received at a receiver end of the circuit 404 and the information to be transmitted from a transmitter end thereof. In a GPON context, for example, these functions may include processing of various subfields in overhead data in a received transmission. The integrated circuit may pre-process these subfields prior to offloading payload information to the subassembly 402. The integrated circuit 404 may identify the corresponding incoming upstream transmission for the OLT and the location, length and value of the various subfields contained in the overhead field. On the transmitter side, the integrated circuit 404 may create the transmitted data overheads based on information from the receiver side as well as information (such as payload information) from the subassembly 402. In fact, one aspect of the architecture 400 is that in some examples information obtained from processing the received data may be used to directly control processing of transmitter data without resorting to offloading all such data retrieval and reconstruction to the subassembly 402. In this way, internal delays in a processing unit of a PON (e.g., an OLT) may be reduced. Further, because clock data recovery may be performed within the integrated circuit 404 and communicated directly with the transmitter within the integrated circuit 404, the architecture 400 may be used to more accurately correct for internal delays.

The subassembly 402 may be provided as part of a systems-on-a-chip (SoC) which may be re-usable for a variety of different implementations, including implementation of different integrated circuits as discussed below. As such, the subassembly 402 provides a "snap-and-run" architecture in which a variety of chips may be coupled to the subassembly 402, and the subassembly 402 is not limited to OLTs 102, much less the example provided herein. The subassembly 402 may therefore be used to reduce the time-to-market chip assembly, as it can be used among a variety of chip designs and to build different chips.

Generally, the subassembly 402 includes an SoC processor 406 for processing the non-time sensitive functions and a memory interface 408 coupled to the SoC processor 406. A memory 410 is further provided and coupled to the memory interface 408 for buffering data from the integrated circuits 404 (e.g., packet buffering) and may include embedded memory management. The memory 410 thereby stores data for execution of non-time sensitive functions to be processed by the SoC processor 406. The SoC processor 406 controls the memory 410 and movement of data packets in and out of the memory 410 as needed.

The SoC processor 406 and the memory 410 are provided external to the integrated circuit 404 to support the processing of non-time sensitive functions while the processing of time-sensitive functions is handled by the integrated circuit 404. Accordingly, the SoC processor 404 and memory 410 may be used to minimize the amount of processing required at the chip level (e.g., packet level). That is, non-time sensitive functions that require additional processing complexity may be passed from the integrated circuits 404 to the subassembly 402. Different types of memories may be used for the memory 410, including double data rate (DDR) memory, flash memory, etc. The memory interface 408 may be provided as an interface corresponding to the memory 410 (e.g., a DDR memory interface, flash memory interface, etc.). The subassembly 402 may further include additional components, such as a debugging port (e.g., a joint task action group (JTAG) port 413), an input/output interface (e.g., a general purpose input/output (GPIO) 415), a receiver and/or transmitter (e.g., a universal asynchronous receiver/transmitter (UART) 417), or other peripheral interfaces in different SoC embodiments. The devices 413, 415, 417, the memory 408 and the processor 406 are all coupled to a backplane bus 418 of the SoC subassembly 402.

As shown in FIG. 4A. the integrated circuit 404 may be a GPON chip 404 coupled to the subassembly 402, thus forming an SoC. The integrated circuit 404, which may be a GPON chip 404, communicates with the SoC subassembly 402 through an interface coupled to the backplane bus 418. Further disclosure of the GPON chip 404 is provided by way of example below. Generally, the GPON chip 404 includes an internal processor, and an SoC interface to the SoC subassembly 402 which interfaces with the SoC processor 406 and with the memory 410 via the memory interface 408. It should be understood that while the architecture 400 is described with reference to particular components, integrated circuits and particular transmission standards, the architecture 400 may be readily applied to different components and standards where time-sensitive and non-time sensitive functions may be applicable, including, but not limited to, wireless and wireline technologies.

While the architecture 400 may include only a passive optical network communicatively coupled to the SoC subassembly 402, the SoC subassembly 402 may be coupled to other types of networks or layers. For example, although the architecture 400 is shown to include a GPON 404 chip which interfaces with the passive optical network 100, it should be understood that different integrated circuits may be utilized in the architecture 400. As seen in FIG. 4A, additional or alternative technologies, such as Data Over Cable Service Interface Specifications (DOCSIS) 412, Digital Subscriber Line (DSL) 414 or Multimedia Over Coax Alliance (MOCA) 416 may be implemented and interfaced with wireline networks.

Figure 4B:
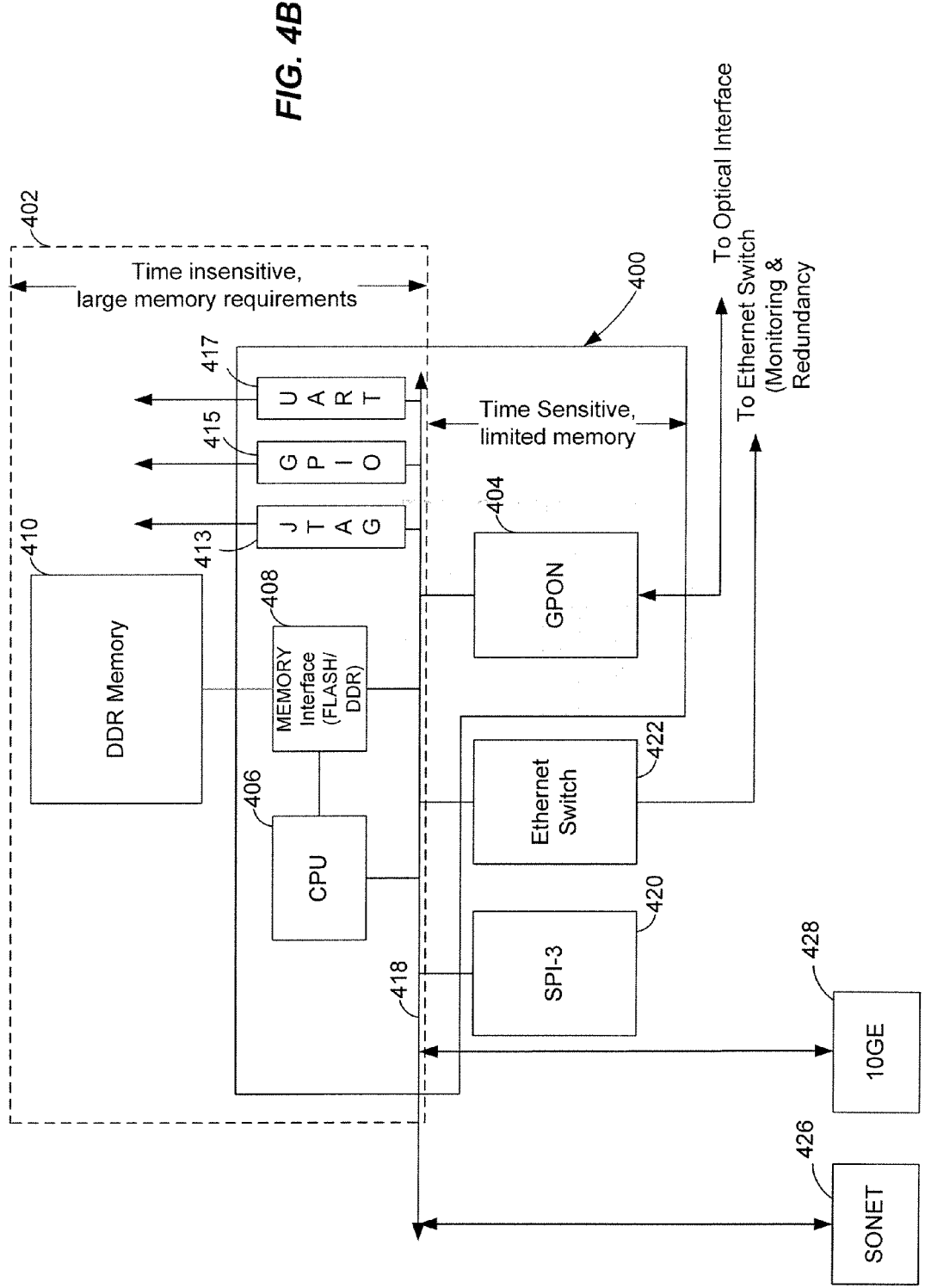
FIGS. 4B-4D are block diagrams of example architecture implementations of the integrated circuit configuration of FIG. 4A, and in the form of an optical line termination device, optical network termination device, and an optical network unit device, respectively.
Figure 4C:
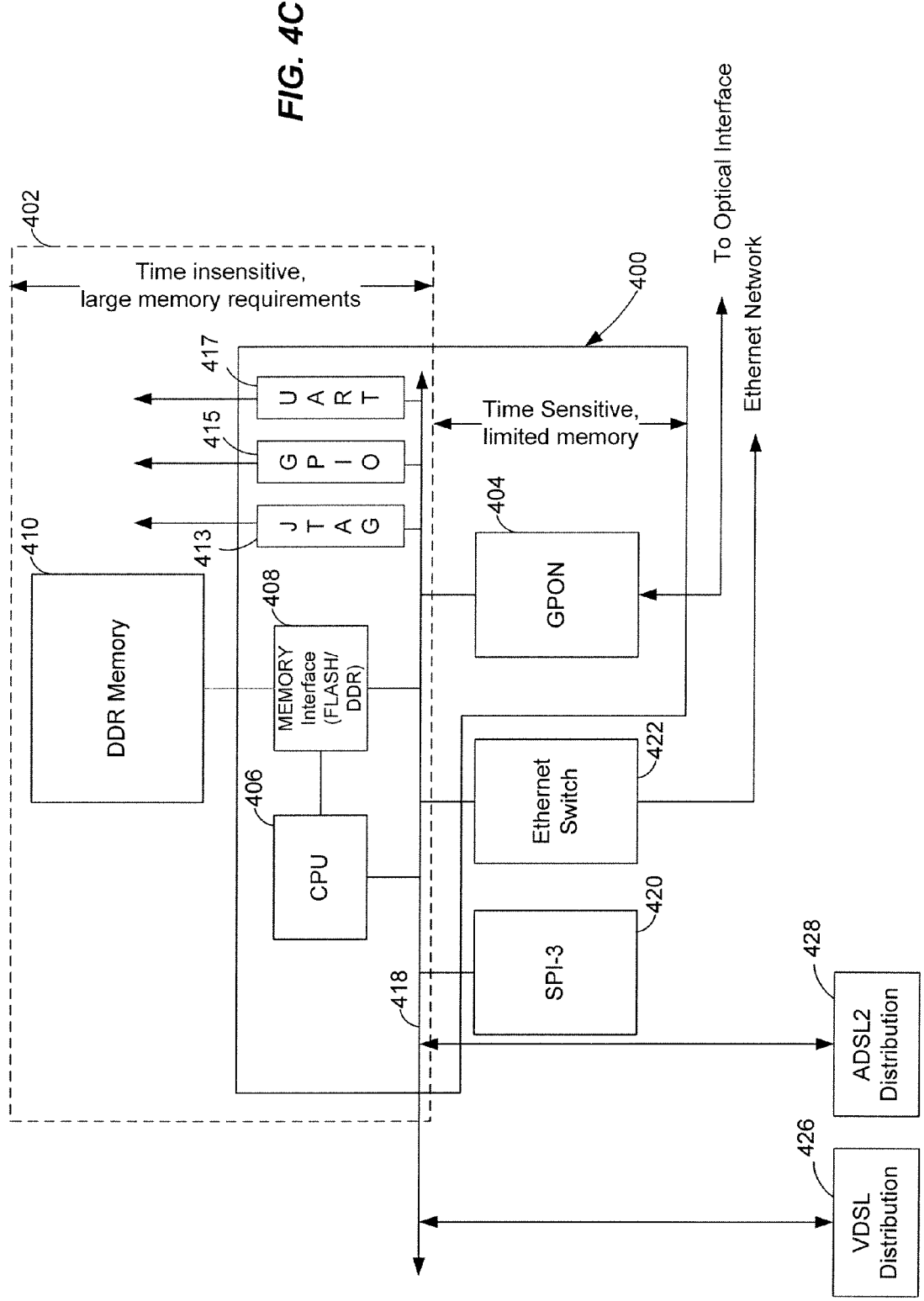
Figure 4D:
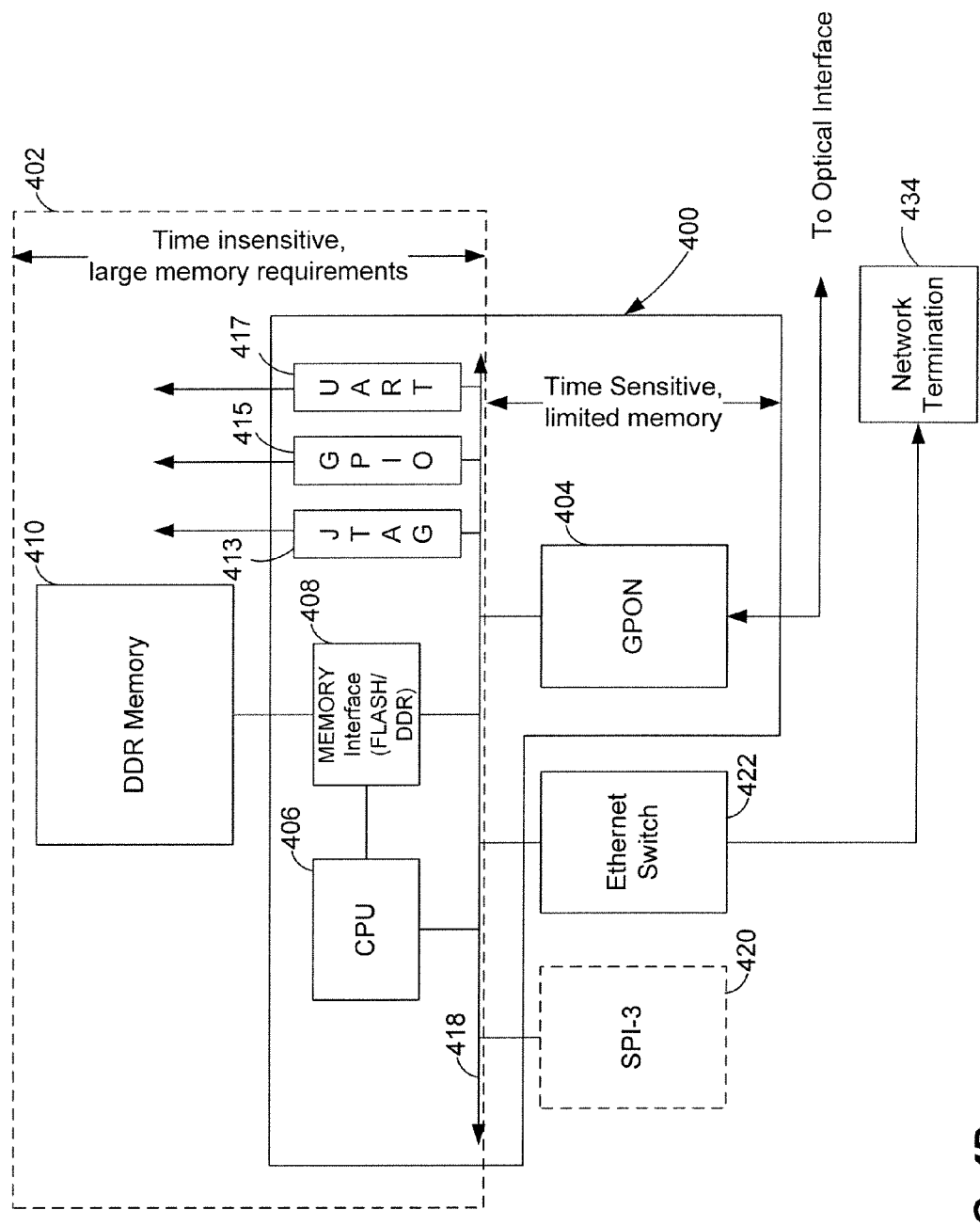
Figure 5A:
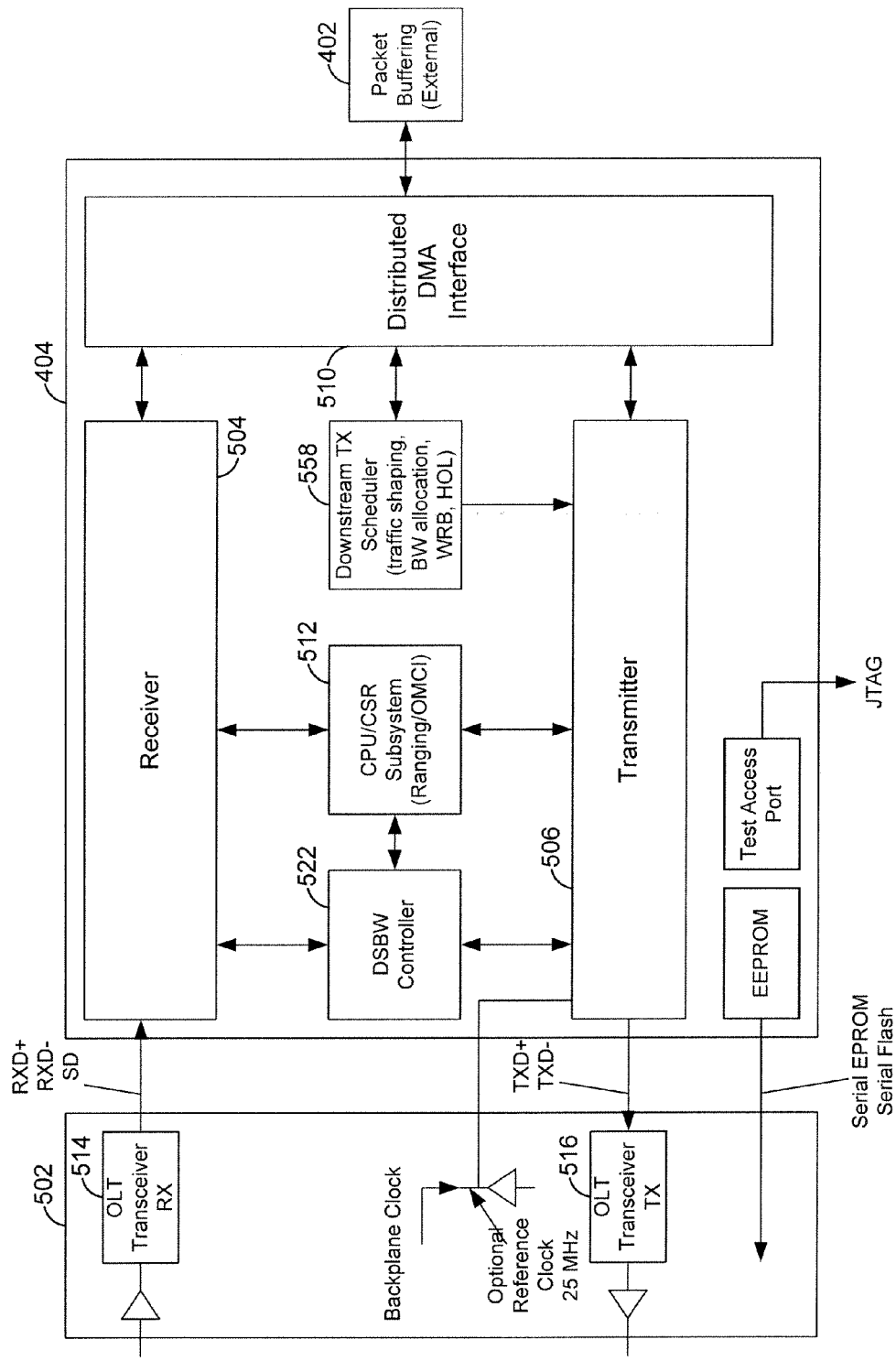
FIGS. 5A-5D are block diagrams of an example gigabit passive optical network chip of a integrated circuit within a passive optical network line termination unit, such as the example shown in FIG. 4A.
Figure 5B:
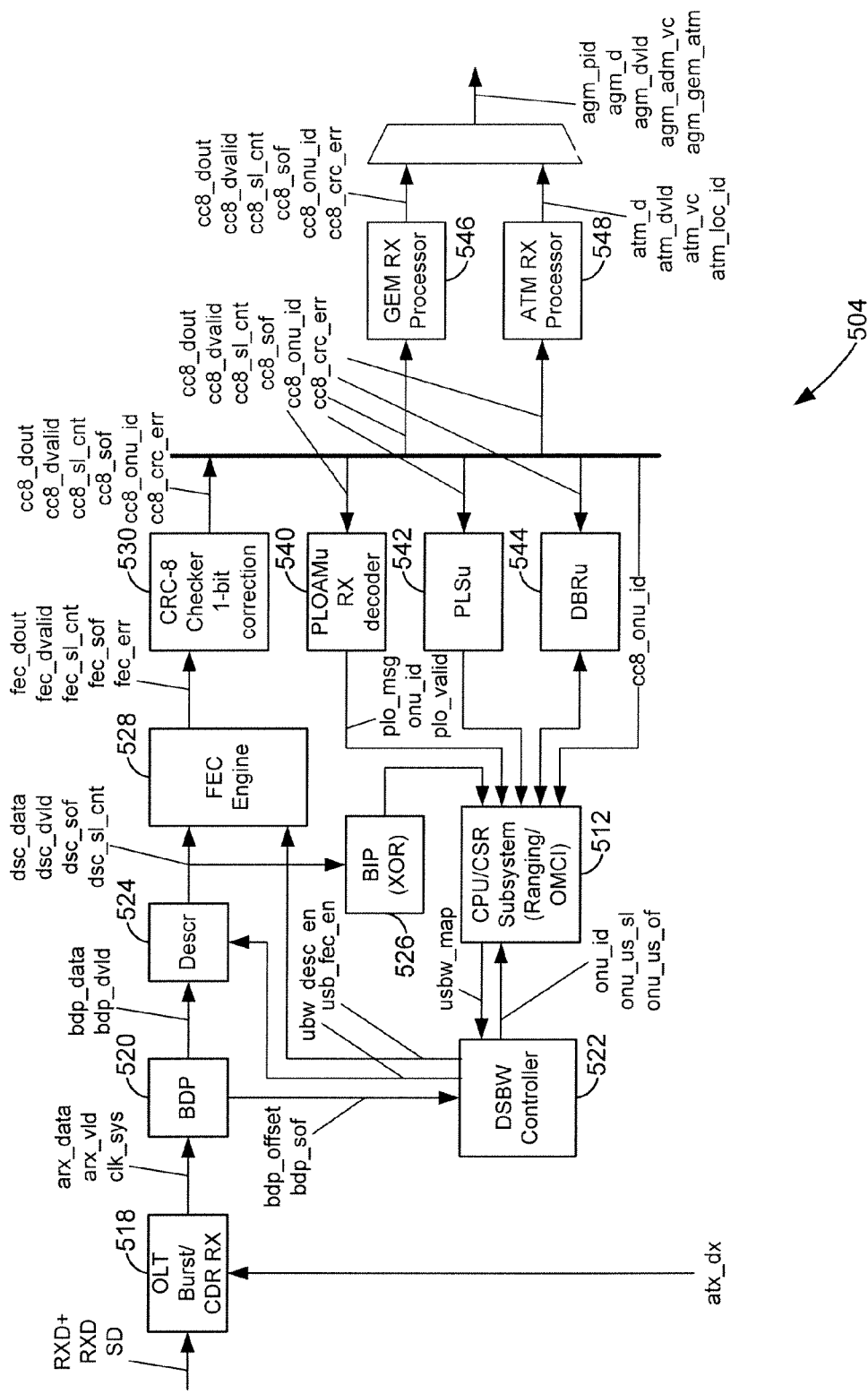
Figure 5C:
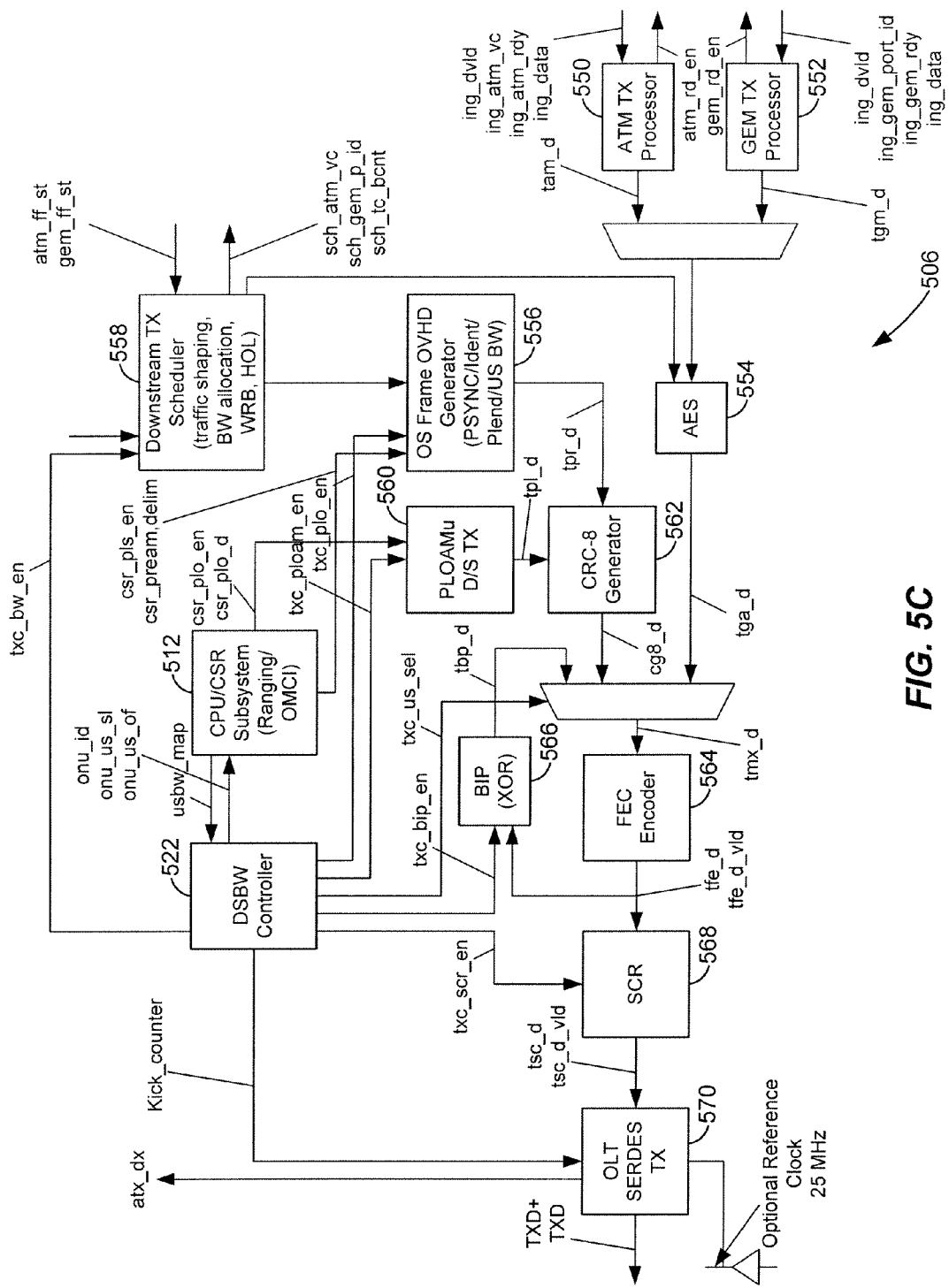
Figure 5D:
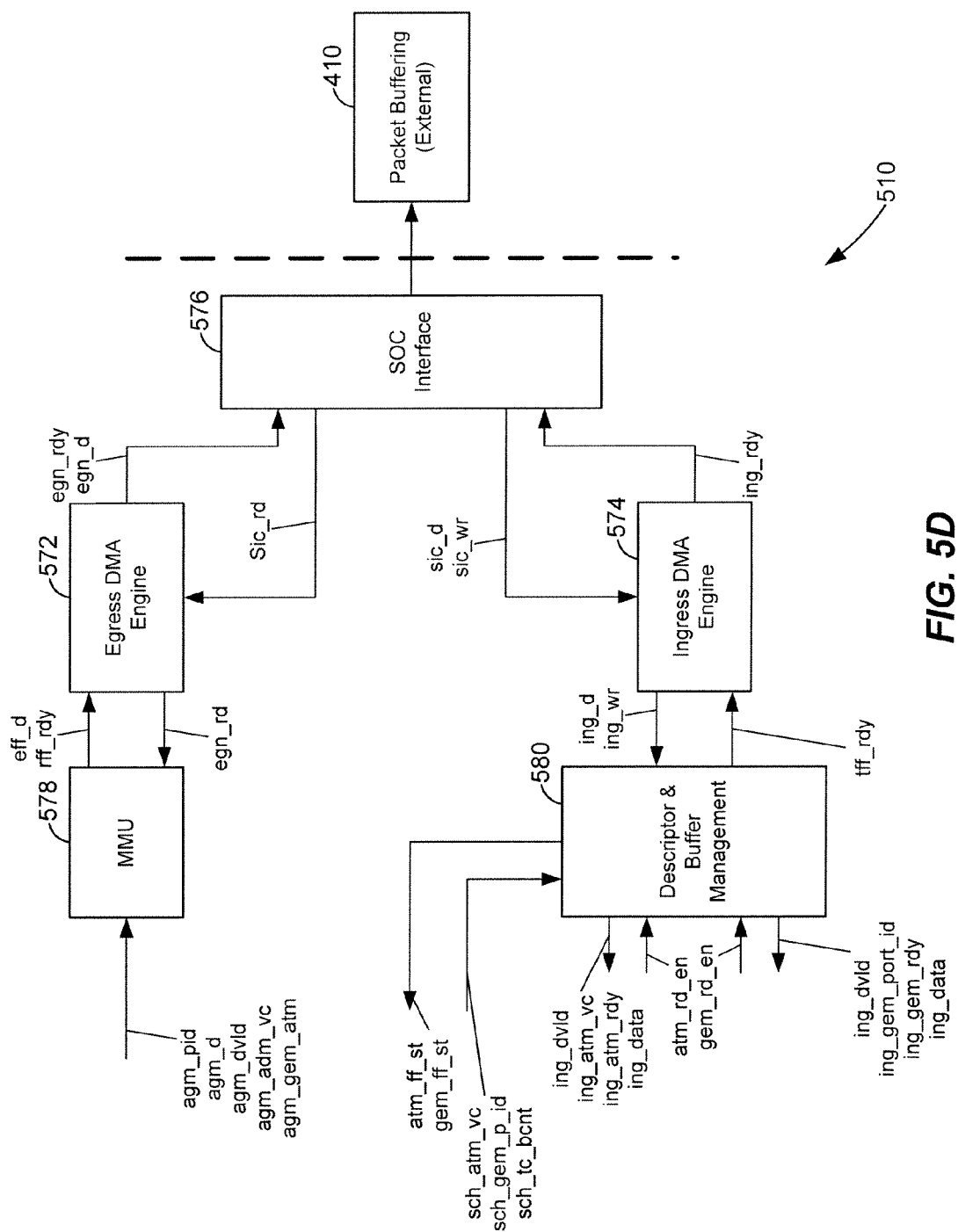

As further examples, the architecture may include an Ethernet switch interface circuit coupled to an Ethernet switch for monitoring and redundancy, a system packet interface layer 3 (SPI-3) circuit to interface with the backplane bus 418 of the SoC subassembly, a synchronous optical network (SONET), Ethernet (e.g., 10 gigabit Ethernet or 10GE), etc. Other layers may also be supported by the architecture. As seen in FIGS. 4B-4D, the SoC subassembly 402 may be coupled to a system packet interface level 3 (SPI-3) circuit 420 for chip-to-chip packet communications through a backplane. In some other examples, the SoC subassembly 402 may be coupled to an Ethernet switch 422, for example for monitoring and redundancy or for connecting to an Ethernet distribution network or network termination device.

FIGS. 4B-4D show example implementations of the architecture 400 used in an OLT, ONT, and ONU application, respectively. FIG. 4B, for example, shows an OLT application in which the SPI-3 circuit 420 is coupled to the backplane bus 418 as are a synchronous optical network (SONET) 426 and a 10 Gigabit Ethernet network 428. FIG. 4C shows an ONT application in which the backplane bus 418 couples the SPI-3 interface 420 to a very high density digital subscriber line (e.g., VDSL or VDSL2) distribution network 430 and an asymmetric digital subscriber line (e.g., ADSL or ADSL2) distribution network 432. FIG. 4D shows an ONU application, in which the SPI-3 interface 420 is optional and the Ethernet interface 422 is coupled to an Ethernet network termination 434, like the NT 108 shown in FIG. 1. Other layers may also be supported by the architecture 400. Generally, whenever a division of the time sensitive versus non-time sensitive functions is desired, each integrated circuit included in the architecture 400 may include an internal processor for execution of the time sensitive functions and an SoC interface to forward data packets for non-time sensitive functions to the sub-assembly 402 for execution therein.

Although many of the above examples have been described with reference to various wireline technologies, it should be understood that various wireless technologies may be utilized with wireless integrated circuits utilized in the architecture 400, such wireless technologies including, but not limited to, the Institute of Electrical and Electronics Engineers wireless local area network IEEE 802.11 standard, Worldwide Interoperability for Microwave Access (WiMAX), Ultra-wideband (UWB) radio technology, and cellular technology. Generally, whenever a division of the time sensitive versus non-time sensitive functions is desired, each integrated circuit included in the architecture 400 may include an internal processor for execution of the time sensitive functions and an SoC interface to forward data packets for non-time sensitive functions to the sub-assembly 402 for execution therein.

In the context of an OLT 102, the GPON chip 404 further includes a receiver for receiving upstream burst transmissions from an ONT/ONU 104, 106, a transmitter for assembling and transmitting downstream transmissions to the ONT/ONU 104, 106 and an optoelectronic interface to the passive optical network 100. The internal processor of the OLT 102 may therefore be used to perform time-sensitive functions associated with the OLT 102, such as assembling the overhead field 202 of a downstream transmission along with functions associated therewith, and processing the overhead field 302 of an upstream transmission along with the functions associated therewith. In the example provided below, the GPON chip 404 is described with reference to the upstream and downstream GPON transmission convergence frame formats discussed above. However, it is noted that the inclusion of an internal processor in the GPON chip 404 not only allows for execution of time sensitive functions, but also allows provides the flexibility to adapt the GPON chip 404 to changes in the GTC frame formats and other related GPON functions including MAC, etc.

FIGS. 5A-5D are block diagrams of an example of a GPON chip 404 for an OLT 102 shown in FIG. 4A, and will be described in the context of the GTC frame formats discussed above. In particular, the GPON chip 404 is coupled to the passive optical network 100 via an optoelectronic transceiver interface 502, and includes a receiver 504 for receiving upstream burst transmissions from an ONT/ONU 104, 106, a transmitter 506 for assembling and transmitting downstream transmissions to the ONT/ONU 104, 106, a distributed direct memory access (DMA) interface 510 to interconnect with the subsystem 402, and an internal processor 512 for processing time-sensitive functions associated with the transmission, such as processing the overhead of an upstream transmission and assembling the frame of a downstream transmission.

The optoelectronic interface 502 generally includes an optoelectronic transceiver receiver 514 coupled to the receiver 504, and an optoelectronic transceiver transmitter 516 coupled to the transmitter 506, though it should be understood that different optoelectronic interfaces may be used. Upstream GTC frame formatted data is transmitted from the ONT/ONU 104, 106 over the fiber 110, 112 into the transceiver 514 and is provided to the receiver 504. Downstream GTC frame formatted data is transmitted from the transmitter 506 to the transceiver 516 for transmission over the fiber 110, 112 to the ONT/ONU 104, 106.

The receiver 504 generally conforms to the upstream transmission format used by the ONT/ONU 104, 106, such as the upstream GTC frame format provided above. In the example provided, the receiver 504 includes a burst clock and data recovery (Burst/CDR) unit 518 that receives the upstream transmission via the transceiver 514. The Burst/CDR unit 518 recovers the network clock and aligns the data unit with the recovered clock to be provided to the next receiving stage. The Burst/CDR unit 518 also recognizes whether the burst transmission or not is a valid transmission are not (e.g., whether the transmission is a burst transmission in the specified upstream GTC frame format). The Burst/CDR unit 518 also recognizes the speed at which the burst transmission is being transmitted and recovers the particular clock associated with the burst transmission.

Once the Burst/CDR unit 518 has validated the upstream transmission, recognized the transmission speed and recovered the associated clock, the clock and data is provided to a Burst Delineation Processor (BDP) unit 520. The BDP unit 520 determines the start of the burst transmission as the information comes in, along with the validation data, the transmission speed, and the recovered clock. In particular, the BDP unit 520 processes the preamble field 312 to synchronize the OLT 102 to the incoming message, and further processes the delimiter in the delimiter field 314 to identify where information in the frame begins and to determine the boundary of the upstream transmission. The combination of the Burst/CDR unit 518 and the BDP unit 520 allows for recovery of upstream burst transmissions at different speeds and synchronize with different clocks associated with the various transmissions.

Once the BDP unit 520 has recognized where the OLT 102 is with reference to the upstream burst transmission, the additional fields of the header 302 may be processed by the receiver 504 in combination with the internal processor 512. In particular, the GPON chip 404 further includes a downstream bandwidth (DSBW) controller 522 which interacts with the transmitter 506 and the internal processor 512 to control the downstream transmissions of the transmitter 506. In processing the delimiter, the BDP unit 520 provides the DSBW controller 522 with a start of frame signal (dbp_sof) and an offset signal (bdp_offset) associated with is the option burst transmission, which may be used by the DSBW controller 522 and the internal processor 512 for enabling the transmitter 506 according to a bandwidth map determined by the internal processor.

The BDP unit 520 searches for a predetermined pattern in the PRMBL/Delim field of a burst transmission 206. Frame transmissions involved frame-by-frame transmissions, such that one the predetermined PRMBL/Delim pattern is recognized, the start and end of the each frame may be automatically determined based on a known frame size. As such, PRMBL/Delim fields in subsequent frame may be readily identified. However, burst transmissions are irregular and vary in size. As such, the BDP unit 520 monitors the transmission on a burst-by-burst basis to search for the PRMBL/ Delim pattern in subsequent bursts. Once the BDP unit 520 finds the PRMBL/Delim pattern, the pattern is validated and the BDP unit 520 delineates where the burst begins and ends. The BDP unit 520 provides a delination valid data provision signal (bdp_dvld) and forwards the upstream transmission (bdp_data) to a descrambler 524. The descrambler 524 may be enabled by the DSBW controller 522 via an upstream bandwidth descramble enable (ubw_desc_en) signal, and descrambles the upstream transmission according to the scrambling technique utilized by the ONT/ONU 104, 106, such as frame-synchronous scrambling polynomial.

The descrambled data (dsc_data), a descramble data provision (dsc_dvld) signal, a descrambled start of field (dsc_sof) signal and a descramble count (dsc_sl_cnt) signal are provided to a bit interleaved parity (BIP) unit 526 and to a forward error correction (FEC) engine 528. The BIP unit 526 processes the BIP field 316 to retrieve the bit interleaved parity provided therein. The BIP unit 526 separately generates the bit interleaved parity and compares the computed result to that of the BIP field 316 in order to measure the number of errors in the link since the last bit interleaved parity. In particular, the computed BIP and the BIP from the BIP field 316 may be XOR'ed by the BIP unit 526. The result of the comparison is provided to the internal processor 512, and the internal processor 512 may determine the number of errors in the communication link between the OLT 102 and the ONT/ONU 104, 106 based on the comparison.

The FEC engine 528 performs forward error correcting on the transmission based on the FEC field 324. In particular, the FEC engine 528 may process a redundant field in the overhead of the upstream transmission to detect and correct errors therein. The FEC engine 528 may be enabled by the DSBW controller using an upstream bandwidth FEC enable (usb_fec_en) signal. The FEC engine 528 forwards the upstream transmission (fec_dout), the validity of the transmission data (fed_dvalid), an FEC counter (fec_sl_cnt), a start of field (fec_sof) signal and the results of the forward error correcting process (fec_err) to a cyclic redundancy checker (CRC) 530. The CRC 530 processes the CRC fields 344, 348 of the upstream transmission, and performs error detection and correction for the corresponding headers or other data fields. As indicated above, the cyclic redundancy check may be CRC-8.

The CRC 530 forwards the upstream transmission (cc8_dout), the validity of the corresponding headers or other data fields (cc8_dvalid), a CRC counter (cc8_sl_cnt), a start of field (cc8_sof) signal, the ONT/ONU 104, 106 identification (cc8_onu) and the results of the cyclic redundancy check (cc8_crc_err) to an upstream physical layer operations and maintenance (PLOAMu) decoder 540, to an upstream power leveling sequence (PLSu) unit 542, to an upstream dynamic bandwidth report (DBRu) unit 544, to a GEM processor 546 and to an ATM processor 548. Further, the ONT/ONU 104, 106 identification (cc8_onu) is provided to the internal processor 512.

The PLOAMu decoder 540 filters and decodes any physical layer operations and maintenance messages from the PLOAM field 306, and reads the PLOAM waiting field 322 to determine if there are any PLOAM messages waiting for a T-CONT. The PLOAMu decoder 540 provides the PLOAM message (plo_msg) to the CPU subsystem 512 along with the ONT/ONU 104, 106 identification (onu_id) and a validity signal (plo_valid) of the PLOAM message. The internal processor 512 may then process the message and perform any corresponding functions, such as allocating bandwidth for the ONT/ONU 104, 106 to transmit a further PLOAM message or otherwise process information sent from the ONT/ONU 104, 106 in response to a previous PLOAM request provided in a downstream transmission. Examples of functions or uses of various PLOAM messages are provided above.

The PLSu unit 542 and the DBRu unit 544 deal with bandwidth control. In particular, the PLSu unit 542 processes the PLSu field 308 to read the power transmission level from the ONT/ONU 104, 106 and provides the power transmission level to the internal processor 512. The internal processor 512 may then determine the dynamic range as seen by the OLT 102, and determine any instructions to provide to the ONT/ ONU 104, 106 to adjust the transmission power level. The internal processor 512 may further determine the bit rate of the upstream transmission. Accordingly, the internal processor 512 may determine further bandwidth allocation for the ONT/ONU 104, 106 to be sent in a downstream transmission. The DBRu unit 544 processes the DBRu field 310 to read the information associated with the T-CONT, including the traffic status of the T-CONT. The information associated with the T-CONT may be provided to the internal processor 512, which, in turn, may use the information to manage the upstream bandwidth allocation for the ONT/ONU 104, 106.

The ATM and GEM processors 546, 548 recover the ATM cells and GEM fragments from the payload 303, respectively. The GEM processor 546 may reassemble the GEM fragments as needed. ATM and GEM processor should be well understood and need not be further described.

The transmitter 506 generally conforms to the downstream transmission format used by the OLT, such as the downstream GTC frame format provided above. In the example provided, the transmitter 506 includes ATM and GEM processors 550, 552 which receive information to be transmitted and formats the information into the format of the payload field 204 (e.g., ATM format or GEM format) of the downstream frame format. Generally, the information in the payload is generated externally from the GPON chip 404 and provided to the processors 550, 552. ATM cells and GEM fragments are multiplexed together in response to a transmit select signal (txc_ag_sel) from the DSBW controller 522. The multiplexed payload may be provided to an encryption unit 554 which encrypts the payload data.

As the payload data is formatted, multiplexed and encrypted, the transmitter 506 assembles the header of the downstream transmission frame. An overhead frame generator 556 generates the overhead field 202, including the PSYNC field 206, the Ident field 208, the Plend field 214, 216 and the US BWmap field 218, each of which are explained above. In particular, the transmitter 506 is coupled to a downstream scheduler 558, the DSBW controller 522 and the internal processor 512. The DSBW controller 522 enables the operations of the transmitter 506, including enabling the overhead frame generator 556 (txc_plo_en), based upon information from upstream transmissions. The internal controller 512 provides the preamble and delimiter (csr_pream, delim) data, and a PLS enable (csr_pls_en) to direct the ONT/ONU 104, 106 to send its PLSu information. The internal processor 512 further generates the upstream bandwidth allocation (usbw_map) which is provided to the DSBW controller 522, and the DSBW controller 522 provides the bandwidth enable signal (txc_bw_en) to the downstream scheduler 558 for inclusion of the upstream bandwidth allocation in the header 202 by the overhead frame generator 556.

A PLOAMu encoder 560 inserts PLOAM messages into the downstream transmission based upon an enable signal (csr_plot en) signal and PLOAM message data (csr_plo_d) generated by the internal processor 512. The DSBW controller further provides an enable signal (txc_plaom_en) to the PLOAMu encoder 560. The PLOAMu data (tpl_d) and the overhead frame generator data (tpr_d) may undergo CRC-8 cyclic redundancy, as needed, by a CRC generator 562 as enabled by the DSBW controller 522 enable signal (txc_bl-p_en).

The overhead data from the CRC generator 562 (cg8_d) along with the multiplexed and encoded payload data (tga_d) are multiplexed together into the downstream GTC frame format. The multiplexed data (tmx_d) is encoded using forward error correcting (FEC) by an FEC encoder 564. As the data is encoded, a BIP unit 566 enabled by an enable signal from the DSBW controller 522 (txc_bip_en) generate a bit interleaved parity for a subsequent frame based on the FEC encoded data (tfe_d). The bit interleaved parity (tbp_d) of the previously transmitted frame is multiplexed with the overhead data (cg8_d) and the payload data (tga_d). A scrambler 568 scrambles the FEC encoded data (tfe_d) and FEC validation data (tfe_d_vld). The scrambled data (tsc_d) and scramble validation data (tsc_d_vld) is provided to a serializer/deserializer (SERDES) 570 which drives the transmitting transceiver 516.

The distributed DMA interface 510 provides distributed management of the packet buffer (e.g., external memory 410). In particular, the distribute DMA interface 510 provides an interface to the sub-assembly 402, and may be implemented in any integrated circuit 404. The distributed DMA interface 510 includes an egress DMA engine 572 and an ingress DMA engine 574. The egress DMA engine 572 and ingress DMA engine 574 are coupled to an SoC interface 576. The egress DMA engine 572 is able to write data (egn_d) directly to the external memory 410 via the SoC interface 576, by providing a ready state signal (egn_rdy) to the subassembly 402 and following a read signal (sic_rd) from the subassembly 402. The ingress DMA engine 574 is able to read data (sic_d) directly from the external memory 410 via the SoC interface 576, by providing a ready state signal (ign_rdy) to the subassembly 402 and following a write signal (sic_wr) from the subassembly 402. As discussed above, the SoC processor 406 is responsible for non-time sensitive functions, the data of which is moved in and out of the memory 410 for processing by the SoC processor 406, and which may be provided from or provided to the integrated circuit 404 as needed. The DMA engines 572, 574 thereby provide DMA processing via CPU 406 control of the sub-assembly 402.

In the context of the GPON chip 404 of FIGS. 5A-5D, data written by the egress DMA engine 572 is provided by the receiver 504 via a memory management unit (MMU) 578. The MMU 578 is coupled to the ATM and GEM processors 546, 548, and receives the recovered ATM cells and/or reassembled GEM fragments from the ATM and GEM processor 546, 548. The MMU 578 and egress DMA 572 are provided with the responsibility of moving the information to the external memory 410. In particular, the egress DMA engine 572 notifies the MMU 578 that it is ready to read data (egn_rd), and the MMU 578 manages access of the egress DMA engine 572 to the external memory (rff_rdy) and provides the data (eff_d) to be written to the external memory 410. The MMU 578 may further provide event generation and a descriptor pre-fetch engine and table for buffer management.

Data read by the ingress DMA engine 574 is provided to the transmitter 506 via a descriptor and buffer management unit 580. The descriptor and buffer management unit 580 may provide a ATM frame status (atm_ff_st) and GEM frame status (gem_ff_st) data to the downstream scheduler 558, and may be controlled by the downstream scheduler 558 based upon a scheduler ATM virtual channel (sch_atm_vc) signal, a scheduler GEM partition identification (sch_gem_p_id) and a scheduler transmission count (sch_tx_bcnt). The descriptor and buffer management unit 580 manages access of the ingress DMA engine 574 to the external memory 410. In particular, ingress DMA engine 574 notifies the descriptor and buffer management unit 580 (ing_wr) it is ready to provide data (ing_d), and the descriptor and buffer management unit 580 notifies the ingress DMA engine 574 it is ready to receive the data (tff_rdy). Based on the scheduling data from the downstream scheduler 558, provides the data (ing_data) to the ATM and GEM processors 550, 552.

The distributed DMA interface 510 is thereby provided with sufficient memory within the GPON chip 404 to pass information in and out of the GPON chip to a larger external memory by virtue of the MMU 578 and the descriptor and buffer management unit 580. In particular, the GPON chip 404 is able to pass data associated with memory-intensive and/or processor-intensive functions that have low time sensitive requirements (e.g., client payload data) to the external SoC processor 406 and memory 410, and reserve the internal processor 512 for time-sensitive functions, such as processing upstream transmission frame and assembling downstream transmission frames.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A line termination unit integrated circuit in a point-to-multipoint network, the line termination unit integrated circuit comprising:

a receiver to receive an upstream transmission from a network termination unit within the point-to-multipoint network, wherein the upstream transmission comprises an upstream transmission convergence frame (UTCF) format having i) an a UTCF overhead field and ii) a UTCF payload field, and wherein the receiver is adapted to separate the UTCF overhead field from the UTCF payload field;

a transmitter to transmit a downstream transmission to a network termination unit within the point-to-multipoint network, wherein the downstream transmission comprises a downstream transmission convergence frame (DTCF) format having i) an a DTCF overhead field and ii) a DTCF payload field, and wherein the transmitter is adapted to combine the DTCF overhead field and DTCF payload field into the downstream transmission; and a time-sensitive internal processor having an interface to a time-insensitive subassembly, the time-sensitive internal processor configured to:

i) process received sub-fields of the upstream transmission within the UTCF overhead field in a time-sensitive manner separated from the UTCF payload field prior to offloading the received UTCF payload field to the time-insensitive subassembly;

ii) assemble the DTCF overhead field prior to combination with the DTCF payload field into the downstream transmission; and iii) control processing of the DTCF overhead field using information obtained from processing the received UTCF overhead field without off loading all of the received UTCF data retrieval and reconstruction to the time-insensitive subassembly.

2. The line termination unit integrated circuit of claim 1, wherein the upstream transmission comprises a burst transmission transmitted from the network termination unit at one of a plurality of speeds, and the receiver comprises a burst clock and data recovery unit to determine the validity of the burst transmission, to recover a clock from the burst transmission and to align the clock and data to determine the speed of the burst transmission.

3. The line termination unit integrated circuit of claim 1, wherein the receiver comprises:
   a burst delineation processor to process a delimiter field in the UTCF overhead field of the upstream transmission, wherein the delimiter field is utilized to determine a boundary of the upstream transmission; and
   a descrambler to descramble the upstream transmission.

4. The line termination unit integrated circuit of claim 1, wherein the receiver comprises:
   a forward error correction unit to process a redundant field in the UTCF overhead field of the upstream transmission to detect and correct errors in the upstream transmission;
   a bit-interleaved parity unit to process a bit interleaved parity from the UTCF overhead field of the upstream transmission and to compare the bit interleaved parity to a threshold bit interleaved parity, wherein the time-sensitive internal processor is adapted to determine a number of errors in a communication link between the receiver and the network termination unit from which the upstream transmission was received based on the comparison; and
   a cyclic redundancy checker to process a checksum field within the UTCF overhead field of the upstream transmission to detect a transmission error.

5. The line termination unit integrated circuit of claim 1, wherein the receiver comprises a physical layer operations and maintenance decoder to decode a physical layer operations and maintenance message from a physical layer operations and maintenance field within the UTCF overhead field of the upstream transmission, wherein the time-sensitive internal processor is adapted to perform an operations and maintenance function based on the decoded physical layer operations and maintenance message.

6. The line termination unit integrated circuit of claim 1, wherein the receiver comprises a power leveling sequencing unit to process a power leveling sequencing field within the UTCF overhead field of the upstream transmission to read a power transmission level from the network termination unit from which the upstream transmission was received, wherein the time-sensitive internal processor is adapted to determine a dynamic range for the receiver based on the power transmission level and a bit rate of the received upstream transmission and to determine a bandwidth allocation and change in power transmission level for the network termination unit from which the upstream transmission was received.

7. The line termination unit integrated circuit of claim 1, wherein the receiver comprises a dynamic bandwidth report unit to process a dynamic bandwidth report field within the UTCF overhead field of the upstream transmission to read a traffic status associated with a transmission container, wherein the time-sensitive internal processor is adapted to manage an upstream bandwidth allocation based on the traffic status.

8. The line termination unit integrated circuit of claim 1, wherein the receiver comprises an upstream frame processor to recover data from the UTCF payload field of the upstream transmission, wherein the upstream frame processor comprises at least one of the group consisting of: a gigabit passive optical network (GPON) encapsulation mode (GEM) frame processor to recover a GEM payload within the UTCF payload field of the upstream transmission, and an asynchronous transfer mode (ATM) cell frame processor to recover an ATM cell payload within the UTCF payload field of the upstream transmission.

9. The line termination unit integrated circuit of claim 1, wherein the transmitter comprises a downstream frame processor to format data into a format associated with the DTCF payload field of the downstream transmission, wherein the downstream frame processor comprises at least one of the group consisting of:
   a gigabit passive optical network (GPON) encapsulation mode (GEM) frame processor to format the data as a GEM encapsulation and an asynchronous transfer mode (ATM) cell frame processor to format the data as an ATM cell, wherein the transmitter comprises an encryption unit adapted to encrypt the formatted data from the downstream frame processor.

10. The line termination unit integrated circuit of claim 1, further comprising a downstream bandwidth controller operatively coupled to the receiver, the time-sensitive internal processor and the transmitter, wherein the downstream bandwidth controller is adapted to enable operations of the transmitter based on upstream transmission traffic received via the receiver and based on an upstream bandwidth map from the time-sensitive internal processor and, wherein the transmitter comprises a downstream transmission scheduler to allocate bandwidth for the downstream transmission.

11. The line termination unit integrated circuit of claim 1, wherein the transmitter comprises:
   a frame overhead generator to insert the DTCF overhead field into the downstream transmission, wherein the frame overhead generator is adapted to insert a synchronization field into the DTCF overhead field of the downstream transmission based on synchronization data and adapted to insert a payload length field based on bandwidth schedule data; and
   a downstream transmission scheduler to allocate bandwidth for the downstream transmission, wherein the frame overhead generator is adapted to receive the bandwidth schedule data from the downstream transmission scheduler and further adapted to insert a bandwidth map field based on the bandwidth schedule data.

12. The line termination unit integrated circuit of claim 1, wherein the transmitter comprises a physical layer operations and maintenance encoder to receive a physical layer operations and maintenance message from the time-sensitive internal processor and to insert the physical layer operations and maintenance message into a physical layer operations and maintenance field within the DTCF overhead field of the downstream transmission.

13. The line termination unit integrated circuit of claim 1, wherein the transmitter comprises a cyclic redundancy check generator to insert a checksum field within the DTCF overhead field of the downstream transmission.

14. The line termination unit integrated circuit of claim 1, wherein the transmitter comprises:
   a multiplexer to multiplex frame data for the DTCF overhead field and the DTCF payload field of the downstream transmission into the downstream transmission convergence frame format; and
   a forward error correction encoder to encode the multiplexed frame data.

15. The line termination unit integrated circuit of claim 1, wherein the transmitter comprises:
   a bit interleaved parity unit to generate a bit interleaved parity for a subsequent frame;

a scrambler to scramble the downstream transmission; and
a serializer/deserializer to drive a transceiver operatively coupled to the transmitter.

16. The line termination unit integrated circuit of claim 1, further comprising a distributed direct memory access engine operatively coupled to the receiver and the transmitter, wherein the distributed direct memory access engine is adapted to directly read data from a packet buffer external to the line termination unit integrated circuit and to directly write data to the packet buffer.

17. The line termination unit integrated circuit of claim 16, wherein the distributed direct memory access engine comprises:
an interface to interconnect the line termination unit integrated circuit and the packet buffer;
an ingress direct memory access engine operatively coupled to the interface and adapted to read the data from the packet buffer and provide the read data to the transmitter; and
an egress direct memory access engine operatively coupled to the interface and adapted to write data from the UTCF payload field of the upstream transmission to the packet buffer via the interface.

18. The line termination unit integrated circuit of claim 17, wherein the distributed direct memory access engine further comprises:
a memory management unit adapted to manage access of the egress direct memory access engine to the packet buffer and provide the write data from the receiver to the egress direct memory access engine; and
a descriptor and buffer management unit adapted to receive scheduling data from the transmitter and to manage access of the ingress direct memory access engine to the packet buffer based on the scheduling data and provide the read data from the ingress direct memory access engine to the transmitter.

19. The line termination unit integrated circuit of claim 17, wherein the interface comprises a system-on-a-chip (SoC) interface to interconnect the line termination unit integrated circuit with a system-on-a-chip (SoC) external to the line termination unit, wherein the system-on-a-chip comprises:
an external processor to control the packet buffer; and
a memory interface operatively coupled to the external processor and operatively coupled to the packet buffer.

20. The line termination unit integrated circuit of claim 19, wherein the external processor is adapted to execute functions associated with the UTCF payload field separated from the UTCF overhead field.

21. A passive optical line termination device comprising:
a) a system-on-a-chip (SoC) subsystem comprising:
i) a time-insensitive SoC processor, wherein:
a transmission comprises a transmission convergence frame (TCF) format having 1) a TCF overhead field and 2) a TCF payload field, and
the SoC processor is adapted to execute functions related to the TCF payload field separated from the TCF overhead field, and
ii) a memory interface operatively coupled to the SoC processor;
b) a memory operatively coupled to the memory interface; and
c) a time sensitive integrated circuit comprising:
i) a distributed direct memory access engine operatively coupled to the time-insensitive SoC processor and the memory interface, wherein:

the distributed direct memory access engine is adapted to interconnect the integrated circuit with the SoC sub-system and to directly access the memory, and
the distributed direct memory access engine comprises:
a system-on-a-chip (SoC) interface;
a first direct memory access engine operatively coupled to the SoC interface to read a TCF payload field from the memory; and
a second direct memory access engine operatively coupled to the SoC interface to write a TCF payload field to the memory;
ii) a transmitter operatively coupled to the first direct memory access engine, wherein the transmitter is adapted to combine a downstream TCF payload field with a downstream TCF overhead field into a downstream transmission;
iii) a receiver operatively coupled to the second direct memory access engine, wherein the receiver is adapted to separate an upstream TCF payload field from an upstream TCF overhead field; and
iv) an internal processor operatively coupled to the transmitter and the receiver, wherein the internal processor is adapted to:
control the time sensitive integrated circuit;
process received sub-fields within the upstream TCF overhead field in a time-sensitive manner separated from a received upstream TCF payload field prior to offloading the received upstream TCF payload field to the time-insensitive SoC processor;
assemble a downstream TCF overhead field prior to combination with a downstream TCF payload field into a downstream transmission; and
control processing of the downstream overhead field using information obtained from processing the received upstream TCF overhead field without offloading all of the received data retrieval and reconstruction to the time-insensitive SoC processor.

22. The passive optical line termination device of claim 21, wherein the distributed direct memory access engine further comprises:
a descriptor and buffer management unit operatively coupled to the first direct memory access engine, wherein the descriptor and buffer management unit is adapted to manage access of the first direct memory access engine to the memory; and
a memory management unit operatively coupled to the second direct memory access engine, wherein the memory management unit is adapted to manage access of the second direct memory access engine to the memory.

23. The passive optical line termination device of claim 21, wherein:
the internal processor of the time-sensitive integrated circuit is adapted to process the received upstream TCF overhead field separated from the received upstream TCF payload field, and
the time-insensitive SoC processor is adapted to process the received upstream TCF payload field separated from the received upstream TCF overhead field.

24. The passive optical line termination device of claim 21, wherein the time-insensitive SoC processor is adapted to move the received upstream TCF transmission payload field in and out of the memory.

* * * * *